United States Patent
Amine

(10) Patent No.: US 8,116,808 B2
(45) Date of Patent: Feb. 14, 2012

(54) NUMERIC BASED ADDRESSING FOR ENHANCED TELEPHONY AND MULTIMEDIA SERVICES

(75) Inventor: Gilbert A. Amine, Austin, TX (US)

(73) Assignee: WorldRelay, Inc., Austin, TX (US)

( * ) Notice: Subject to any disclaimer, the term of this patent is extended or adjusted under 35 U.S.C. 154(b) by 424 days.

(21) Appl. No.: 12/423,758

(22) Filed: Apr. 14, 2009

(65) Prior Publication Data

US 2009/0258634 A1 Oct. 15, 2009

Related U.S. Application Data

(60) Provisional application No. 61/044,902, filed on Apr. 14, 2008.

(51) Int. Cl.
  *H04M 1/00* (2006.01)
(52) U.S. Cl. ..................... 455/550.1; 455/551
(58) Field of Classification Search ............... 455/550.1, 455/551, 403, 415, 414.1, 407
See application file for complete search history.

(56) References Cited

U.S. PATENT DOCUMENTS

| | | | |
|---|---|---|---|
| 5,768,358 A * | 6/1998 | Venier et al. | 379/221.14 |
| 6,370,136 B1 | 4/2002 | Silva et al. | |
| 6,526,277 B1 * | 2/2003 | Zicker et al. | 455/426.2 |
| 6,721,403 B1 | 4/2004 | Mandalia | |
| 6,748,057 B2 | 6/2004 | Ranalli et al. | |
| 6,970,915 B1 | 11/2005 | Partovi et al. | |
| 6,993,004 B2 | 1/2006 | Boys | |
| 7,116,939 B1 | 10/2006 | Kandler | |
| 7,146,158 B2 | 12/2006 | Belkin et al. | |
| 7,149,469 B2 | 12/2006 | Russell | |
| 7,206,745 B2 | 4/2007 | Sarukkai et al. | |
| 2003/0007626 A1 * | 1/2003 | Glebocki | 379/229 |
| 2003/0045306 A1 | 3/2003 | Himmel et al. | |
| 2003/0198323 A1 * | 10/2003 | Watanabe | 379/88.21 |
| 2004/0235458 A1 * | 11/2004 | Walden et al. | 455/414.1 |

* cited by examiner

*Primary Examiner* — Peguy Jean Pierre
(74) *Attorney, Agent, or Firm* — Jackson Walker L.L.P.

(57) ABSTRACT

An end user device includes an application processor, a baseband processor, and a radio transceiver, storage accessible to the application processor, and computer executable instructions, embedded in the storage, for a user agent application. The user agent application includes instructions for transmitting a directory server inquiry in response to entry of a numeric sequence followed by a data termination sequence, wherein the directory server inquiry is indicative of the numeric sequence and the numeric sequence is associated with a targeted entity. The instructions further include instructions for receiving information indicative of at least one service associated with the targeted entity in response to the directory server inquiry and generating a display indicating the associated service or services when the mobile device includes a suitable display.

30 Claims, 13 Drawing Sheets

NUMERIC BASED ADDRESSING FOR ENHANCED TELEPHONY AND MULTIMEDIA SERVICES

This application claims priority to U.S. Provisional Patent Application No. 61/044,902, entitled Numeric Based Addressing for Enhanced Telephony and Multimedia Services, filed Apr. 14, 2008, which is incorporated by reference herein.

FIELD OF THE DISCLOSURE

The disclosed subject matter is in the field of communication networks and, more particularly, the provisioning of telephony and data services via broadband networks

BACKGROUND

The public switched telephone network (PSTN) employs numeric based addressing in the form of conventional telephone numbers to enable users to communicate with each other. In contrast, much of the addressing paradigm for network-based content including multimedia content is alphanumeric from the end user's perspective. For example, alphanumeric expressions, in the form of uniform resource identifiers (URIs), are widely employed to access content via an Internet protocol (IP) compliant network such as the Internet itself.

Another distinction between conventional telephone services and IP based content is the directory services available to locate "others" on the network, e.g., telephone numbers in the case of traditional telephone services and URIs in the case of IP based networks. Locating content on IP networks generally includes an end user accessing a search engine with a browser to formulate and submit a content search, generally including an alphanumeric text string containing keywords, i.e., words that convey a description of the desired content.

Convergence of telephony and data services is progressing rapidly. Although Voice over IP (VoIP) has been viable for some time, the advent of third generation (3G) networks including 3G wireless networks will accelerate the deployment of telephony services on IP-based platforms. The increasing pervasiveness and sophistication of cellular telephones, personal data administrators (PDAs), and other network-capable handheld devices has similarly expanded the volume of data traffic accessed via mobile telephony devices.

In a related trend, multimedia content providers including traditional radio and television broadcasters, satellite providers, and others are increasingly making their content available on the Internet. This trend has expanded the number and geography-base of the recipients of this type of content and challenged traditional assumptions and models regarding the most effective form of advertising for these channels. At the same time, other multimedia content providers including "new media" stations are emerging that use the Internet as their exclusive distribution medium.

DESCRIPTION OF EXEMPLARY EMBODIMENTS

Figure 1:
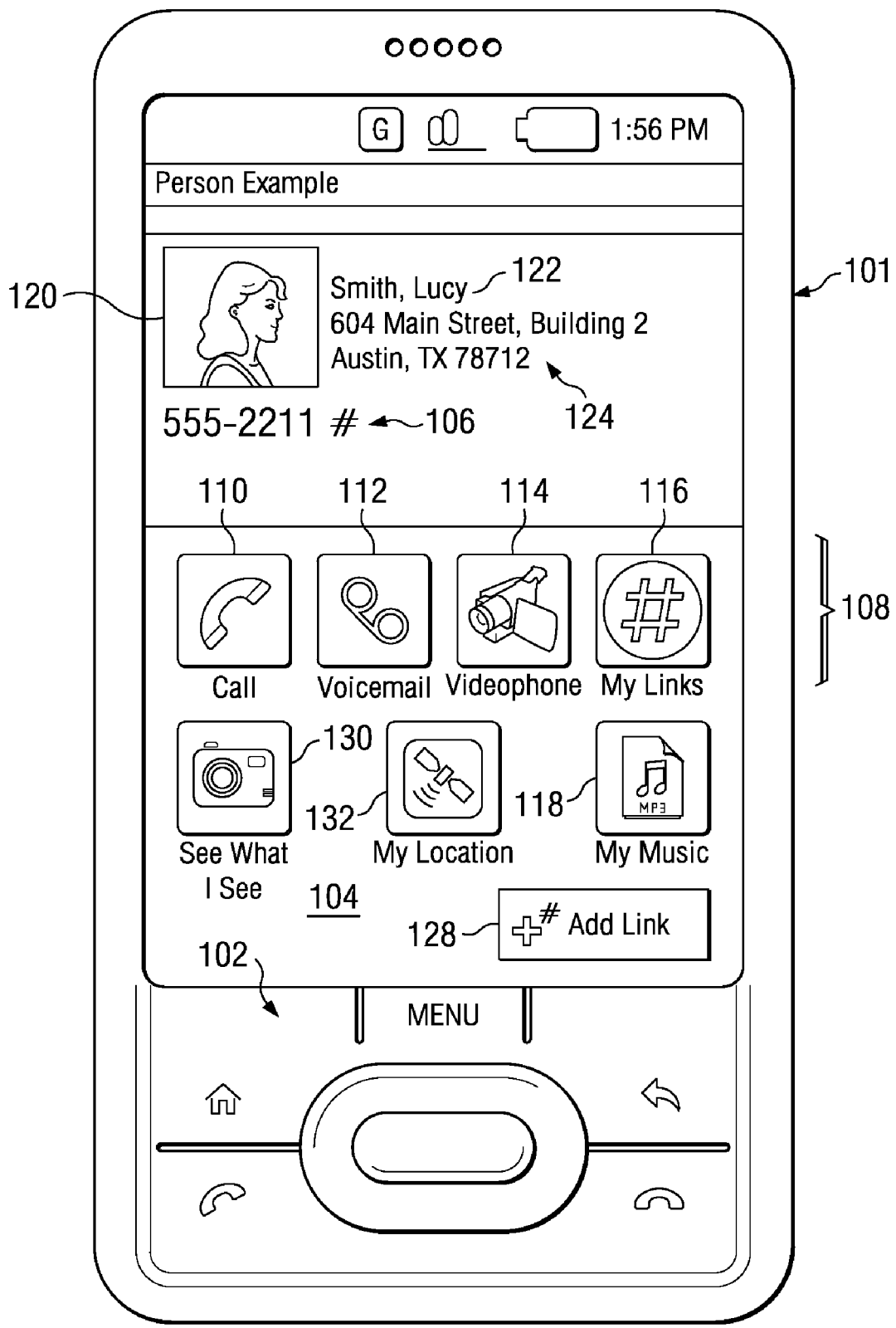
FIG. 1 illustrates an exemplary display screen of an embodiment of an end user device populated with information and selectable objects pertaining to an individual.

In one aspect, the disclosed subject matter encompasses a network addressing scheme based on telephone numbers, radio station frequencies, television station channels, and other non-conflicting channel numbers to provide access to a variety of services and content for end user devices (EUDs) that have access to wired and/or wireless networks.

A large number of traditional radio and television broadcasters are now streaming their content over the Internet in order to expand their base of listeners and viewers. In addition, thousands of "new media" stations which broadcast their content exclusively on the Internet have also emerged. Such stations are growing in popularity.

Many directories exist for online radio and TV content. Such directories may provide content listings along with links to each of the stations. This approach to providing content directories, while adequate for most Personal Computer (PC) users has numerous limitations. It is not suitable for use in broadband-connected consumer devices that have a limited display and a limited number of buttons, such as 3G mobile phones, IP Phones, Internet radios or portable wireless media players. In addition, it is difficult to keep up to date, as stations make changes to their websites resulting in changes in the URL address of the station's media server. Moreover, it is not complete as many smaller US stations and individual broadcasters as well as international broadcasters are kept out by some of the directories.

There is no single, universal addressing scheme that is used to uniquely identify and tune to a particular station. The addressing scheme that is used on the Internet is world wide web-centric and not telephony centric, i.e. to listen to the streaming of a radio station, such as KUT (Austin, Tex. 90.5

FM), the user has to first look up the station's web address, access and navigate through the website and launch a media player which supports the streaming and audio formats that are used by the station. Such tasks are relatively easy to do on a PC, but are cumbersome, if not impossible to do on a mobile telephone or a car radio, for example.

The public switched telephone network (PSTN) and the cellular networks have both developed over many decades and have focused primarily on the reliable delivery of voice communication. Both networks are evolving towards IP-based signaling and transport systems which are more cost-effective than circuit-switched technologies. Content is located at fixed or dynamic IP addresses that are tracked by Domain Name Servers (DNS). Web browsers are used to access search engines which are used to locate content. DNS servers provide IP address lookup and web browsers are used to access the content. A broadband telephone cannot readily "dial" into such content.

Groups such as E.164 Number Mapping (ENUM) facilitate IP-based communication services by providing a standard for associating telephone numbers with Session Initiation Protocol (SIP) addresses, e-mail addresses, and general Uniform Resource Identifiers (URIs). ENUM provides telephone numbers to domain name-based URI association. Thus, a browser-equipped telephone could employ ENUM to access some Internet-based content that is associated with a destination telephone number but, apart from the telephone number to URI association, ENUM implementations are based on a domain name platform.

In the described embodiments, telephone numbers are directly associated with information, services, and content. The association is done based on the telephone number and not on a domain-name basis. The telephone number is not simply a proxy for a domain name.

In at least some of the disclosed embodiments, a telephone number is not used solely as a source or destination of a voice communication (telephone call), but also as a source or destination of data services, including multimedia content services, that may be provided or supported by an entity that is associated with the telephone number. The entity may be a business entity, a person, or another type of entity. For example, Mr. John Doe has an EUD that serves as a cellular telephone and as a portable digital audio player such as an MP3 player. The number 555-1234 serves as the telephone number for the cellular telephone. In some embodiments, the same number (555-1234) is also associated with the MP3 player. Another party can reach Mr. Doe's EUD by simply dialing the number from another terminal with MP3 capability. If, however, the same number is entered with a specified termination key or key sequence referred to herein as a data termination sequence (DTS), the other party may be presented with access to the content associated with Mr. Doe's MP3 player, Mr. Doe's digital photos, and so forth.

In this manner, a number enables a "caller" not only to talk with the entity associated with the number, but also to access content or services that are associated with the number. In this implementation, Mr. Doe's EUD serves as a source or broadcaster of content that Mr. Doe can choose to make available to a small circle of friends and family or to the world.

Thus, in some aspects, the disclosed subject matter discloses a method of accessing content from broadcasters that differs from traditional over-the-air and/or over-the-web accessed content. The disclosed method associates a broadcaster's content with the broadcaster's telephone number or a telephone-like number. In the case of traditional broadcasters, since subscribers may not be familiar with the full telephone number of a particular radio station, the disclosed subject matter includes an exemplary plan for assigning readily memorable abbreviated numbers to a broadcaster. In some embodiments, the abbreviated numbers leverage the country and city/area code where the broadcaster is located together with the frequency (for radio stations) or channel (for TV stations). For example, in some embodiments, an abbreviated number for the Austin, Tex. radio station KUT, is 512 90*5, which includes the area code for Austin (512) and the broadcast frequency of the radio station. If this abbreviated number is followed by a DTS, the caller might receive a set of one or more icons or other form of selectable objects where the selectable objects correspond to information, content, or other types of services that are associated with the radio station. If the caller happens to know a phone number of the radio station, the caller may also access the same set of selectable objects by entering the radio station's phone number followed by a DTS. The abbreviated number plan may be configured specifically to ensure no overlap or conflict with actual telephone numbers.

In some embodiments, the disclosed dialing plan builds upon the North American Numbering Plan (NANPA) and the internationally-accepted ITU-T E.164 international public telecommunication numbering plan with an upward-compatible dialing plan that provides additional information about the targeted party and access to new services. In some embodiments, the existing dialing plans are supported with little or no change. The user dials the desired telephone number and is connected across a cellular network and/or the public switched telephone network (PSTN). However, if the user enters a DTS, the entered number is sent to a Dialed Number Directory Server (DNDS).

The DNDS determines whether additional services are available and associated with the dialed number. If a DNDS finds services associated with the dialed number, the user is presented with all or some of the associated services and corresponding server addresses, depending upon the end user's devices capabilities and/or the caller's profile. The caller may then elect to invoke any of the services offered.

If the DNDS finds no match for the dialed number, the DNDS may generate a query to one or more public or other form of Reverse Telephone Directory Databases to find the name and address that are associated with that number. If found, the retrieved information is presented to the user. If a mapping and/or directions service is available to the user, the address could be used to show its location on a map or to provide directions, should the user request it.

In some implementations, the DNDS may generate a query to a SIP Proxy Server, which in turn can enable peer-to-peer services including media sharing, Global Navigation Satellite System (GNSS) location information, camera view display (See What I see). The peer-to-peer services may be controlled by a mobile web server application on the called number terminal and a web client application on the caller's terminal or PC. The terms "caller" and "called" parties in this context refers to the initiator and receiver of the communication exchange which may or may not include voice communication. In some cases, it may be desirable for servers to cache the information of the called number's terminal for speed and access when the called terminal is turned off.

In some implementations, the DNDS may generate a query to an Internet web search engine and return content from a website associated with the dialed number. The website content is normally obtained through a Wireless Application Protocol (WAP) 2.0 compatible gateway. This will reduce the transmission time and provide information in a format that can be properly displayed on mobile terminals. Many website offer mobile versions of their websites while others require conversion through the gateway In another aspect, a disclosed electronic device includes an application processor, memory, a keypad or other suitable input means, a display screen or display output port, a speaker or an audio output port, and a wired or wireless communication transceiver or a data port that can connect to an external wired or wireless communication transceiver. In some embodiments, the device also includes a microphone or audio input port, which together with the speaker or audio output port, will make it possible to make and/or receive telephone calls. The electronic device may be a handheld, mobile, or other form of wireless device and the transceiver(s) may include wireless elements.

The device may include software, firmware, hardware, or a combination thereof that comprises a numeric addressing application. In some embodiments, the numeric addressing application is enabled to initiate the establishment of a telephony connection in response to detecting entry of a numeric sequence followed by a first type of terminating entry or delimiter or no terminating entry or delimiter. The device may be further enabled to transmit a data request or other form of data message to a server in response to detecting entry of the same numeric sequence when the numeric sequence is followed by a second type of terminating entry or delimiter, such as a DTS. In this disclosure, the term numeric sequence includes a sequence of numbers, possibly including a decimal point delimiter such as the "*" key on a standard telephone keypad. Although the second type of terminating entry or delimiter could be otherwise depending upon the implementation, the "#" key on a conventional telephone keypad is used throughout this disclosure as the second type of date termination sequence. The first type of termination or sequence may be referred to herein as a telephony termination sequence.

Thus, for example, the disclosed device might establish a conventional telephony connection with a second party if the numeric sequence is the second party's telephone number and the sequence is followed by no terminating entry or the first type of terminating entry. If the numeric sequence is terminated with the "#" key or another implementation of a DTS, the server to which the data request is transmitted may be a directory server and the transmitted message may be indicative of the numeric sequence. In these embodiments, the server may respond to the message by sending, or causing another server to send, data back to the device. Although the DTS is described as following the sequence, other embodiments may include not following this convention and the DTS may, for example, precede the numeric sequence.

The data sent back to the device may be in the form of data from which something analogous to a web page may be generated, e.g., data from which a user interface suitable for displaying on the display screen and including one or more icons, links, or other selectable objects. In this case, the selectable objects may represent actions that may be taken with respect to an entity associated with the numeric sequence and/or information about the associated entity. For example, if the numeric sequence is a telephone number of a business, the selectable object(s) presented to the device's display screen might include a "location" object that, when selected by a user of the device, displays a map and/or directions to the business. As another example, a product object might be presented that, when selected, provides the device user with information about products or services offered by the entity. If, for example, the entity is a restaurant, a product object might present the device user with the restaurant's menu. The selectable objects might further include a "leave message" object that, when asserted, enables the device user to leave a voice message with the entity. A "call party" object might also be included. The call party object, when asserted, might initiate a conventional telephone call to the entity.

In the case where a numeric sequence is associated with an individual, e.g., the numeric sequence is an individual's telephone number, the selectable object(s) returned to the device may include a message object, a call party object, and a location object. In addition, the selectable objects may include "personal" objects including, as examples, a "playlist" object that, when selected, presents one or more music and/or video playlist of the individuals, an "images" object that, when selected presents one or more pictures or images of the individuals.

In some cases, the selectable objects that are presented to the device might include a set of "stock" objects that may be determined by the service provider and that may be uniform across a number of businesses. In other cases, the selectable objects may include customized objects that are unique to and/or developed by the associated entity. The service provider may offer businesses and others the opportunity to define these types of customized objects, possibly in exchange for a fee, as a method of branding or otherwise distinguishing themselves from their competitors.

In some implementations, the, service provider may provide "baseline" selectable objects even if the entity associated with a numeric sequence is not a subscriber to the service provider's entities. For example, with respect to individuals, the service provider may acquire the information needed to generate at least some of the baseline objects from public records. Using white page and yellow page reverse directories, for example, the service provider may be able to generate the "call party" and "location" objects if the numeric sequence is listed in the publicly available records.

In some embodiments, the service provider may implement the services described herein using one or more servers. In one implementation, for example, the data requests or messages generated when a subscribing user enters the "#" key at the end of a numeric sequence are initially routed to a directory server that is configured to determine if the numeric sequence corresponds to a phone number of a "subscriber." In this context, it should be noted that the service provider recognizes two types of subscribers, namely, the subscribers to the enhanced telephony service, as well the businesses and other entities that want to present customized or other valued added information to end users.

In some cases, the data sent back to the device might be in the form of a stream of multimedia content transmitted by a multimedia content provider. In these embodiments, the multimedia content provider can be a radio station, television station, or other type of multimedia broadcaster that makes at least some of its content available for streaming onto the Internet or another network. The numeric sequence that invokes a particular multimedia content provider might be, in the case of radio stations, for example, the radio station's frequency in KHz or MHz as appropriate, of the station, possibly preceded by an area code or other numeric sequence to identify a particular broadcaster when multiple broadcasters have a license to broadcast, within their respective areas, on a particular frequency. Thus, for example, the user could dial a numeric sequence such as 95*5, followed by the DTS.

In another aspect, a disclosed method of providing enhanced telephony service includes recognizing an electronic device having telephony functionality as an authorized or registered device, enabling the registered device to establish a telephony connection in response to entry of a numeric sequence followed by a first type of termination, and enabling the registered device to establish a data connection, suitable for communicating data, in response to entry of the numeric sequence followed by a second type of termination, e.g., a DTS. The telephony connection is suitable for accommodating real-time voice communication between two or more participants. The data connection may be suitable for transmitting data that is analogous to web page data.

In still another aspect, a disclosed method of offering a data service employing numeric addressing includes detecting a dialed input comprising a numeric sequence followed by a DTS, responding to detecting the dialed input by transmitting a message indicative of the numeric sequence to a first directory server, detecting and processing information responsive to the message. Processing the information may include displaying at least one icon for taking an action pertaining to an entity associated with the dialed number or playing multimedia content transmitted by the associated entity.

Referring now to the drawings, FIG. 1 illustrates an embodiment of numeric based addressing when the entity that is called is a person. FIG. 1 depicts an example of a user's EUD 101. In the depicted embodiment, EUD 101 is a mobile or wireless and handheld electronic device that includes cellular telephony functionality as well functionality for accessing network accessible data content including multimedia content. EUD 101 includes a keypad 102 and a display screen 104. In FIG. 1, keypad 102 does not include hard keys or a telephone style keypad, e.g., the numbers 0 through 9, the "*" key, and the "#" key, but it will be appreciated that EUD 101 may include soft keys (not depicted in FIG. 1) to incorporate analogous or identical functionality. Other embodiments of EUDs 101 may include hard keys and/or a telephone-style keypad. Still other embodiments may include additional hard keys or soft keys, e.g., keys for a full QWERTY key pad.

The display or user interface shown on display screen 104 as depicted in FIG. 1 is exemplary of the result of a user entering a numeric sequence, referred to herein as the targeted number, e.g., a telephone number, of an individual, referred to herein as the targeted party, followed by a DTS. As depicted in FIG. 1, when EUD 101 transmits a dialing entry 106 that includes a numeric sequence, e.g., a telephone number, associated with the targeted party followed by the "#" key or other DTS, some embodiments of numeric based addressing and directory services populate display screen 104 with a set of one or more selectable objects 108. The objects 108 represent information or services that are associated with the numeric sequence that was entered. For example, in FIG. 1, where the numeric sequence corresponds to the targeted party, the objects 108 may represent information about the targeted party, services authorized by the targeted party, content or resources of the targeted party, or a combination thereof.

As depicted in FIG. 1, the set of selectable objects 108 includes a "CALL" object 110, a "VOICEMAIL" object 112, a "VIDEOPHONE" object 114, a "MY LINKS" object 116, an "MP3" object 118, a "SEE WHAT I SEE" object 130, and a "MY LOCATION" object 132. In addition, information about the targeted party including an image 120, the targeted party's name 122, and a corresponding address 124 are included in the display.

The set of links 108 shown in FIG. 1 are exemplary of the types of links that an individual may provide to originating parties. The CALL object 110 enables the origination party to complete a telephone call to the targeted party. This object provides the same function that the user could invoke by dialing the numeric sequence without following it by the DTS. The VOICEMAIL object 112 enables originating parties to be connected directly to a voice mailbox of the targeted party. This object represents highly desirable and useful functionality that permits originating parties to go directly to voice mail. Currently, it is generally difficult if not impossible for an originating party to leave a message without first "ringing through" to the called number unless the targeted party has configured the number to go directly to voice mail. If, for example, an originating party needs to leave a message very late at night or early in the morning, the originating party could dial the numeric sequence for the targeted party followed by a DTS, select object 112, and leave the message without ever disturbing a targeted party and without having to interact with a substantial interactive voice response system.

In some embodiments, SEE WHAT I SEE (SWIS) link 130 is associated with a feature in which the originating party may gain access to a video device of the targeted party. If, as an example, the targeted party's SWIS link 130 is associated with a camera in the targeted party's mobile, handheld device, the originating party, upon asserting the SWIS link 130 may view an image currently or previously captured by a camera on the targeted party's mobile device.

In the depicted example, the end user can be contacted by telephone, via object 110, or video telephone via object 114. The user has also made her favorite "links" available via selectable object 116 and her MP3 collection available via MP3 object 118. If the "caller" wishes to listen to Ms. Smith's MP3 collection, he can press MP3 object 118. In some embodiments, pressing the MP3 object may establish a SIP-based or other type of peer-to-peer session between the two devices using, for example, the RTP/RTCP protocols or other protocol(s) suitable for streaming multimedia content.

In some embodiments, Ms. Smith can make any of the objects 108 available selectively only to those other entities that she chooses through the use of a "buddy list" or other mechanism. The use of EUD 101 has the option of selecting any of the selectable objects 108 to invoke the desired service or access the desired set of information associated with Ms. Smith. Moreover, all of these services are accessible via a single addressing scheme that is based on telephone numbering scheme. In addition to being highly efficient by aggregating access to various services and information under a single numeric address, the use of telephone number is highly compatible with EUDs that may not have a full QWERTY keyboard. Display screen 104 as shown in FIG. 1 also includes a selectable ADD LINK object 128 that, when selected, causes the currently presented listing to be added to a contact list or "favorites" list of the EUD.

Figure 2:
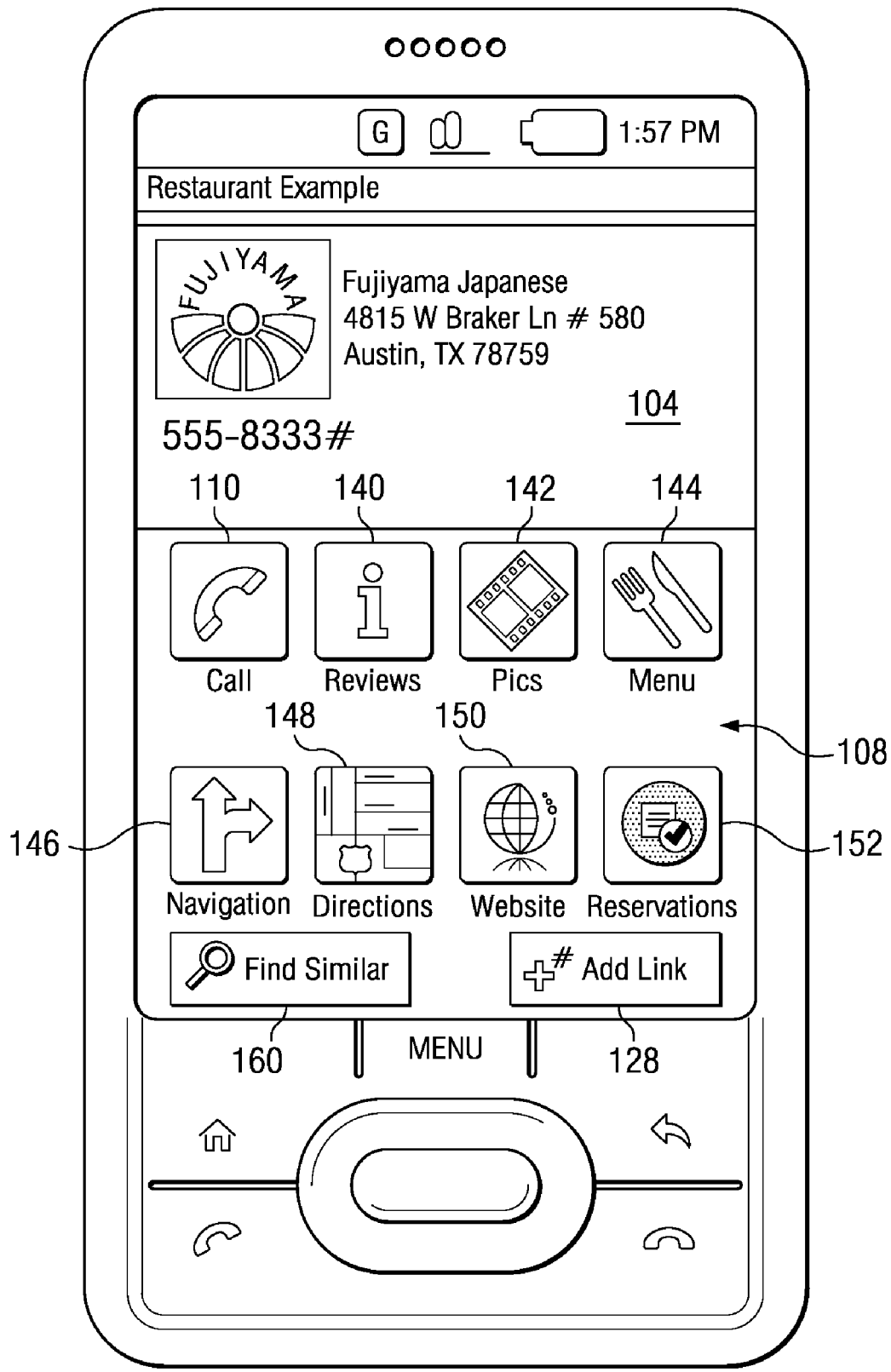
FIG. 2 illustrates an exemplary display screen populated with information and selectable objects pertaining to a restaurant.

Turning to FIG. 2 through FIG. 6, exemplary display screens 104 illustrate various implementations when the numeric sequence entered by EUD is associated with a business. In FIG. 2, for example, the numeric sequence 555-8333 is phone number of a Japanese restaurant. In this example, the set of selectable objects 108 that populate display screen 104 when the user enters the numeric sequence followed by the DTS include a CALL object 110, analogous to the CALL object 110 of FIG. 1, a REVIEWS object 140 that may provide access to published or unpublished reviews of the restaurant, a PICS object 142 that may provide access to photographs of the restaurant, dishes served by the restaurant, or both. Also depicted are a MENU object 144 that may provide access to the restaurant's current menu, a NAVIGATION object 146 that may work in conjunction with GNSS functionality of the EUD 101 to provide real time directions to the user as the user drives to the restaurant, a MAP/DIRECTIONS object 148 that may provide access to an image or text where the restaurant is and how to get there, a WEB object 150 that may provide access to the restaurant's Web site 150, and a RESERVATIONS object 152 that may provide access to a reservations number or interactive service enabling the user to make reservations.

In addition to the selectable objects 108, display screen 104 as shown in FIG. 2 includes a "FIND SIMILAR" object 160. In this embodiment, the user may wish to find a different restaurant in the vicinity if, for example, the original restaurant is very crowded, expensive, hard to find, and so forth. Selecting the FIND SIMILAR object 160 may invoke a service that identifies one or more alternatives for the user. In the case of the Japanese restaurant, for example, selecting the FIND SIMILAR object 160 may prompt a response that populates display screen 104 with a similar listing for a different restaurant or populates the display screen with a list of restaurants from which the user may then select. Display screen 104 as shown in FIG. 2 also includes an "ADD LINK" object 128 similar to FIG. 1.

In some embodiments, the set of selectable objects 108 that populate an EUD display screen 104 may be influenced by the capabilities of the EUD itself. If, for example, a particular EUD does not have GNSS functionality, the navigation object 146 might be omitted from the objects that are provided to the EUD. As another example, the MP3 object 118 depicted in FIG. 1 might be omitted from any EUD that lacks the capability of playing MP3 files. Similarly, the objects presented to an EUD might also depend on a profile of the EUD's user. If, for example, a particular service offered by an entity requires a subscription or is limited to callers from certain geographies, limited to certain times of day etc., a selectable object corresponding to the service may not be displayed.

Figure 3:
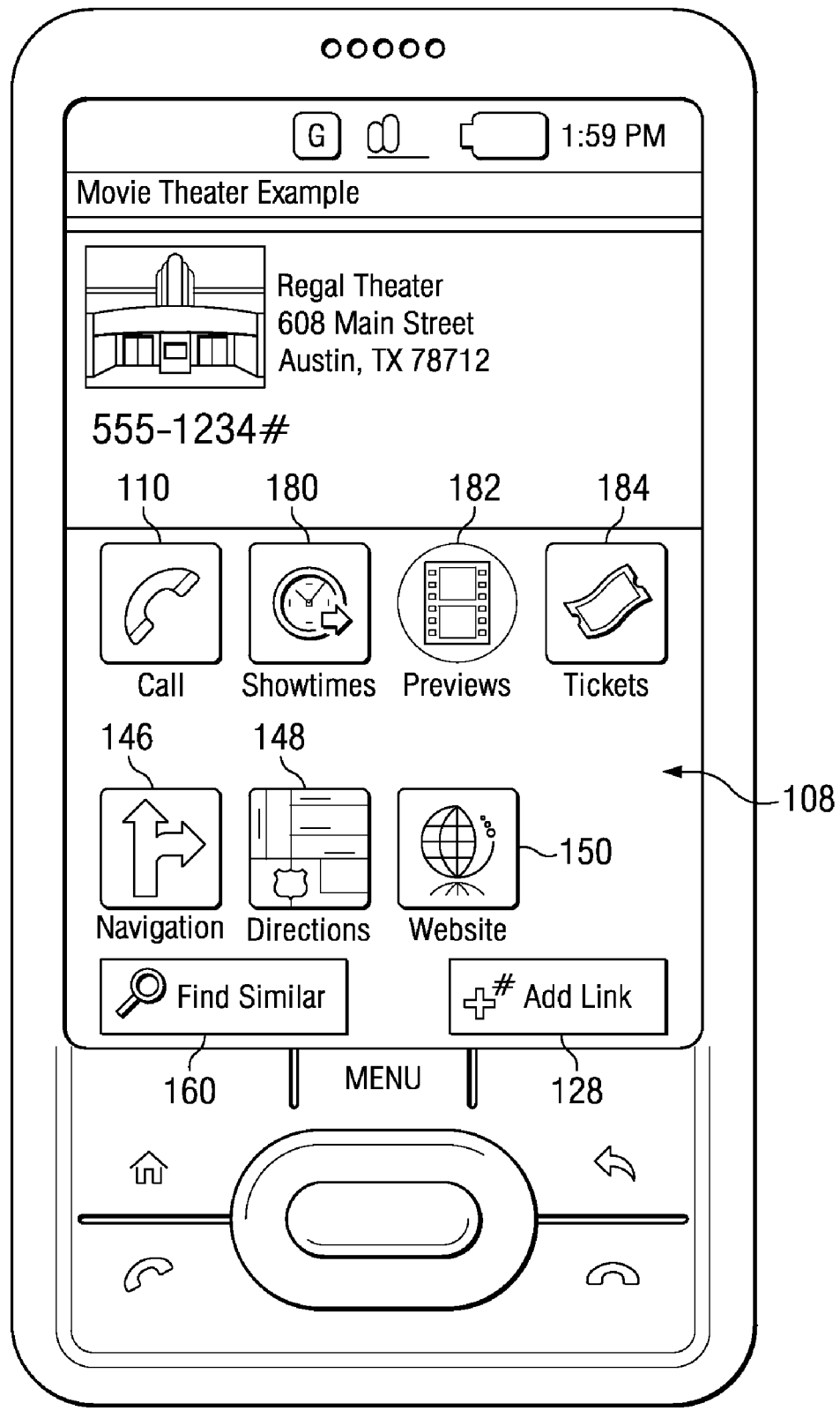
FIG. 3 illustrates an exemplary display screen populated with information and selectable objects pertaining to a movie theater.

Referring to FIG. 3, an exemplary embodiment of the objects that populate display screen 104 when the entity is a movie theater is shown. In the depicted embodiment, the set of selectable objects 108 in this case include, again, some objects that are specific to or tailored to the type of business, and other objects that may be common to one or more types of businesses. In this example, the set of business-specific objects 108 include a SHOWTIMES object 180 that may provide access to a listing of show times for the films currently playing at the theater, a PREVIEWS object 182 that may provide access to textual or multimedia previews of the movies being shown, and a TICKETS 184 object that may enable EUD 101 to purchase tickets for a selected show.

The selectable objects 108 illustrated in FIG. 3 also include NAVIGATION object 146, a DIRECTIONS object 148, a WEB object 150, a FIND SIMILAR object 160, and an ADD LINK object 128 analogous to those described earlier.

Figure 4:
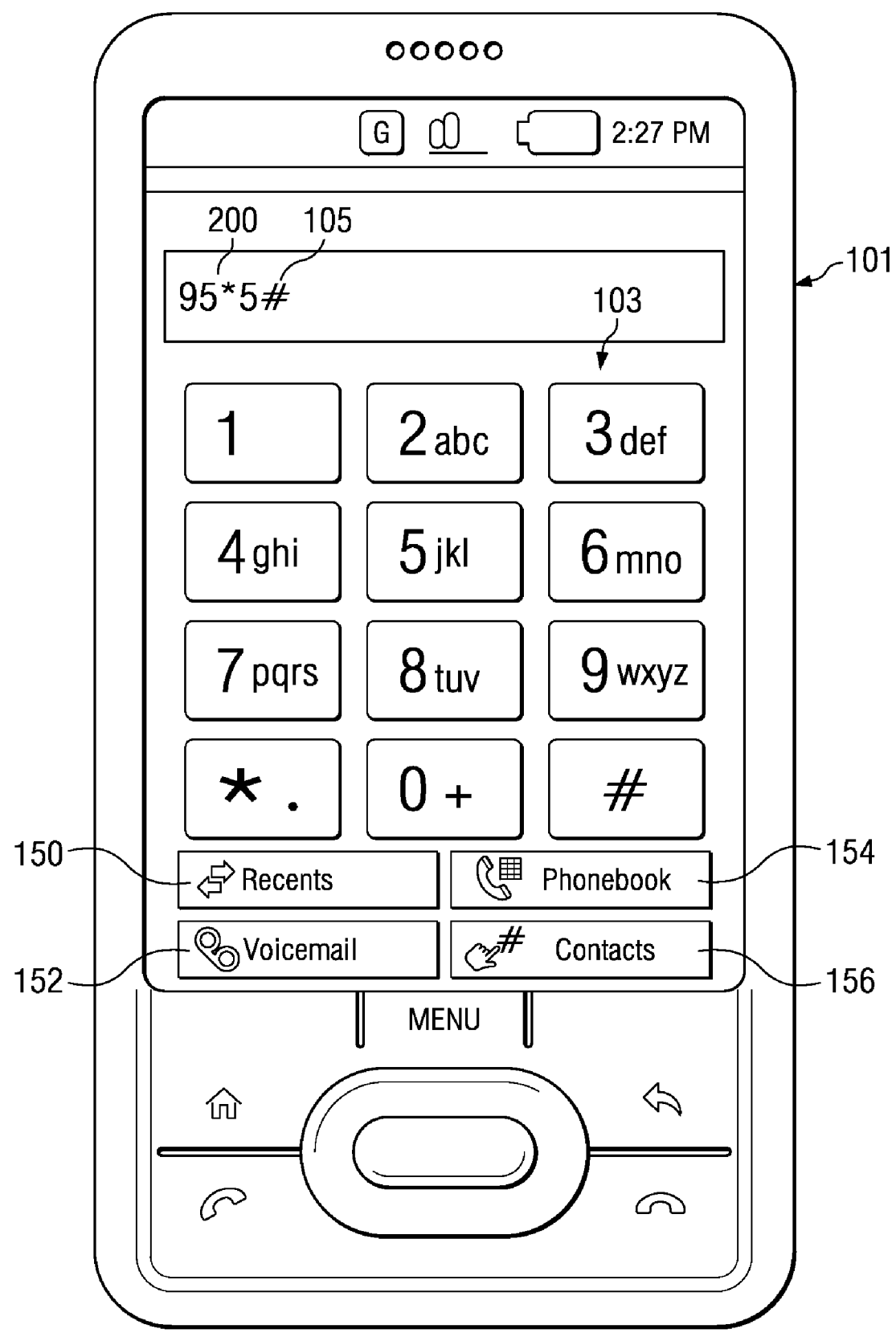
FIG. 4 illustrates an embodiment of abbreviated dialing for a radio station.

FIG. 4 illustrates an example of an aspect of numeric based addressing and directory services that facilitates access to certain types of business entities that are readily associated with a numeric sequence other than their telephone number. Broadcast radio stations, for example, broadcast on a frequency that is unique within the broadcasters designated area of operation. The frequency of a radio stations transmission may be leveraged to provide an abbreviated numeric sequence by which listeners and other consumers can access to the station. As depicted in FIG. 4, for example, an EUD 101 is shown with its hard key or soft key numeric or telephonic keypad 103. FIG. 4 depicts the EUD 101 entering an abbreviated numeric sequence 200 followed by the DTS 105. In this case, the numeric sequence 200 is 95*5 where the "*" key represents a decimal and the numeric sequence represents the broadcast frequency of an AM or FM radio station. Upon entering the abbreviated numeric sequence 200 followed by the DTS 105, the user is provided with selectable objects, if any, that provide access to services associated with the radio station.

Figure 5:
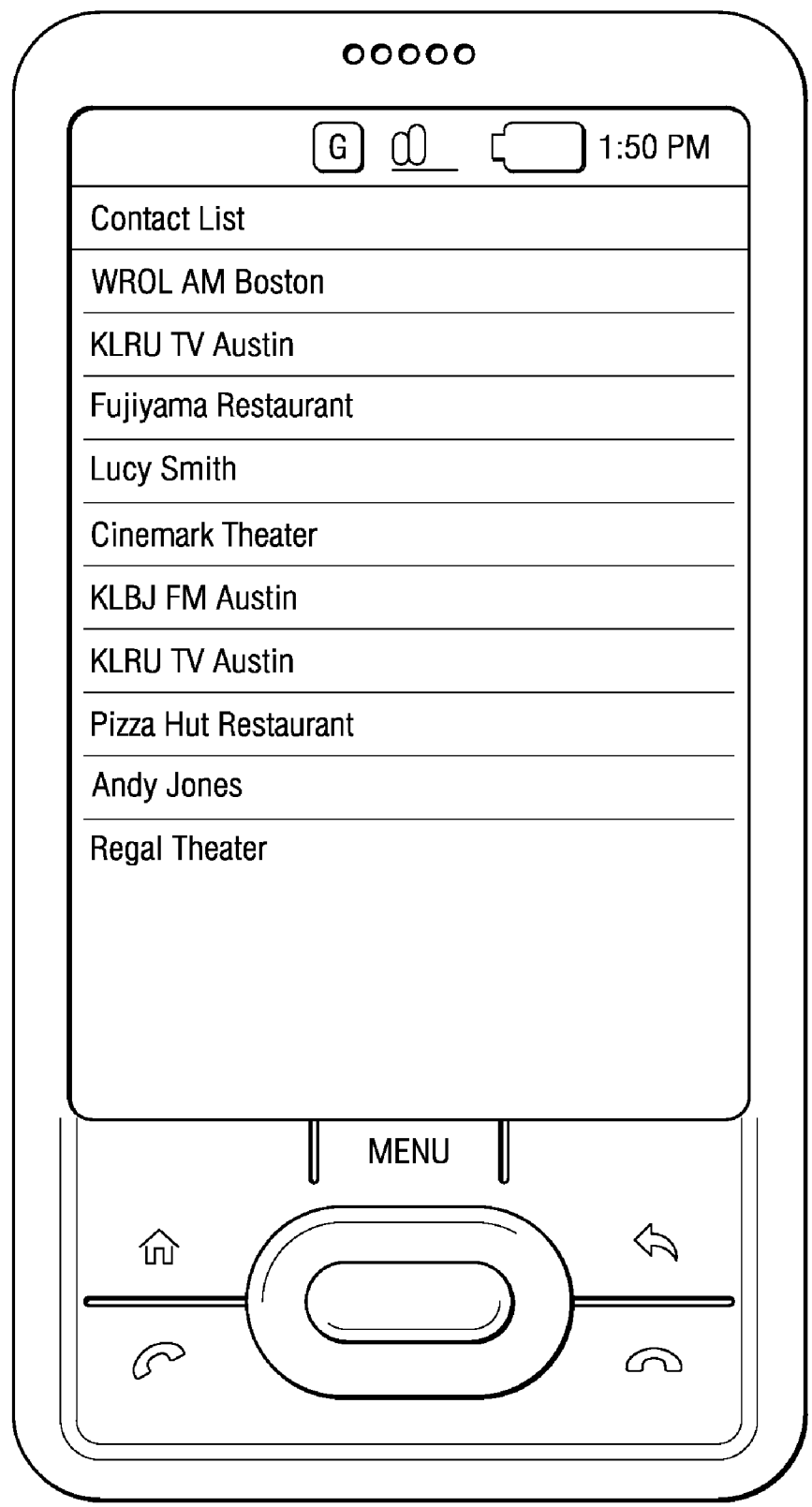
FIG. 5 illustrates an embodiment of a contacts menu.

FIG. 4 also depicts a display screen 104 of an EUD 101 that includes various function buttons including a RECENTS 150 button that may provide access to recently accessed numeric sequences, telephone numbers, or the like, a VOICEMAIL button 152 that may provide access to a voice mail application and/or a user's voice mail box, a PHONEBOOK button 154 that may provide access to a locally stored phone book or list of contacts, and a CONTACTS button 156 that may provide access to a list of the individuals and/or entities that the user has accessed using the numeric sequence and DTS described herein. An illustration of an exemplary menu presented in response to the user pressing the CONTACTS button 156 is depicted in FIG. 5.

Figure 6:
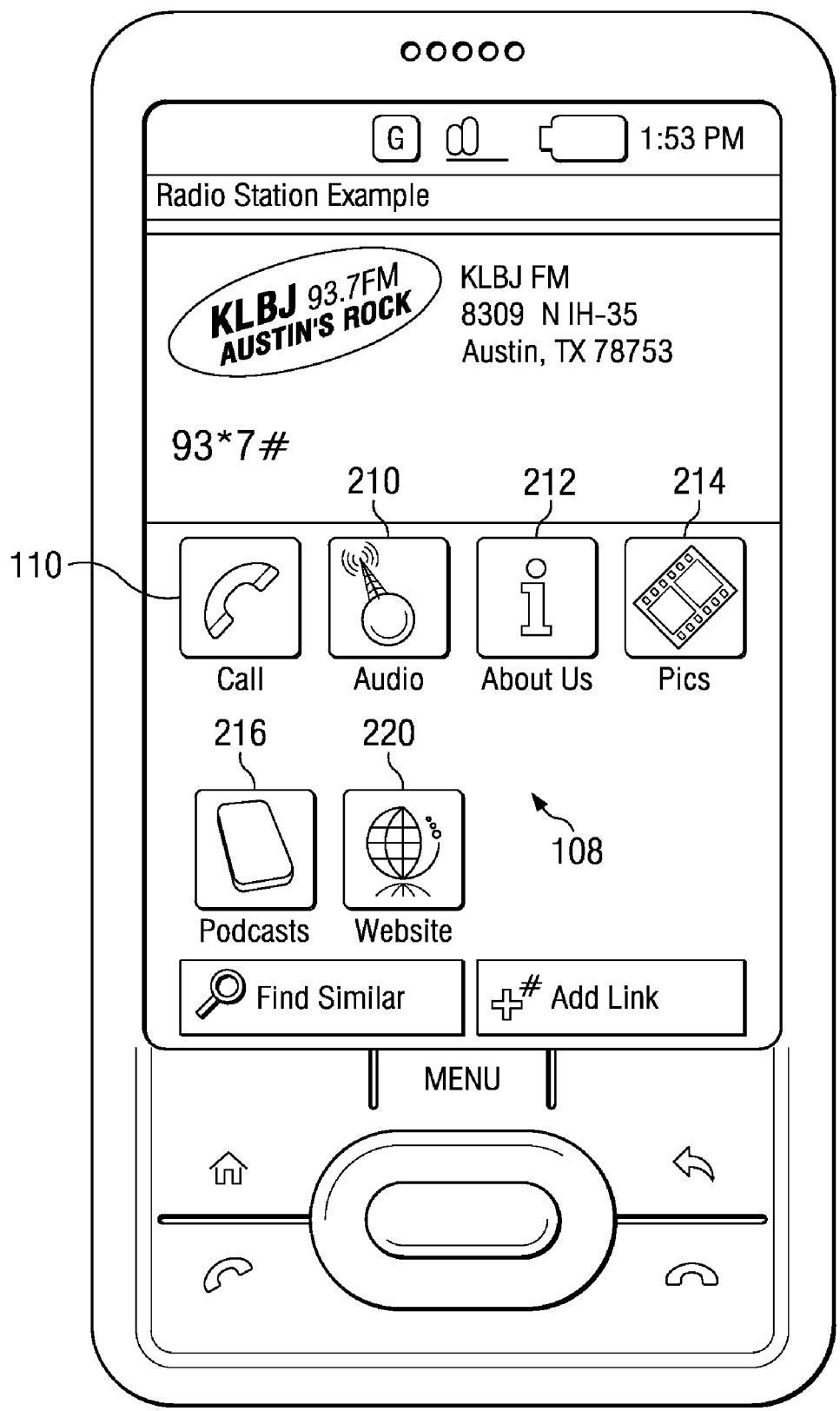
FIG. 6 illustrates an exemplary display screen populated with information and selectable objects pertaining to a radio station.

FIG. 6 depicts a set of selectable objects 108 presented in one embodiment in response to the entry of a numeric sequence that identifies a radio station (KLBJ) that broadcasts on FM frequency of 93.7 MHz. In the depicted embodiment, the set of objects 108 includes a CALL object 110, an AUDIO object 210, an ABOUT US object 212, a PICS object 214, a PODCASTS object 216, and a WEBSITE object 220. In some embodiments, the AUDIO object 210 provides access to the broadcast content of the applicable radio station. In some embodiments, selecting the AUDIO button 210 enables a session or other type of connection with a streaming media server of the broadcaster so that the broadcast content may then be streamed to EUD 101. The WEBSITE button 220 may provide the user with access to the radio station's web site, perhaps invoking a browser that may be customized for or compliant with the Wireless Application Protocol (WAP).

Because radio station broadcast frequencies are only unique within specified geographical regions, some embodiments incorporate a "locality" concept into the numeric addressing implementation. For example, if a user enters an abbreviated numeric sequence consisting solely of the broadcast frequency of a radio station followed by the DTS 105, a user agent residing with the EUD or another application may "assume" that the request is for a radio station broadcasting at that specified frequency within an area code associated with the EUD. If, for example, the telephone number of an EUD includes the area code (512), the abbreviated numeric sequence may be processed as a numeric sequence associated with one or more radio stations that broadcast at a frequency of 95.5 MHz within the (512) area code. If multiple such radio stations exist, it may be necessary to populate the display screen 104 with a list or other type of display from which the user may select the desired radio station.

A feature ancillary to the concept of locality is the ability to pre-program or otherwise select a locality that is different that the user's current locality for purposes of enabling readily available access to content that may be specific to a particular geographic region. If, for example, a user traveling on business to a new city wishes to listen to the radio while in a rental car or elsewhere. If the user has no familiarity with the local stations, the user must search through all of the stations to find one that the user likes, if there is one. With the alterable locality functionality described herein, the user could, instead, preset an EUD with the area code of the user's hometown. The EUD might then process all abbreviated numbers as if the numbers were specific to the user's hometown area code. If this functionality is incorporated into a Worldwide Inter-operability for Microwave Access (WiMax) radio, for example, pressing the "scan" or "search" buttons might then cause the radio to scan through the abbreviated numbers associated with radio stations in the user's hometown area code. From the user's perspective, pressing the "scan" button causes the radio to scan through the radio stations of the user's hometown. If the user then wants to find radio stations in Paris, France, for example, the user could pre-set the locality of an EUD to Paris by, for example, pre-setting the country code and area code for Paris, e.g., by entering the country code and area code and then pressing and holding the "#" key for three seconds.

In conjunction with the ability to configure an EUD as described herein to behave as if it were located in a different region or geography, some embodiments of the numeric addressing and directory services incorporate the ability to insert or otherwise "mix" advertising into the broadcast stream so that the advertising that the user is presented with is relevant to the user.

Figure 7:
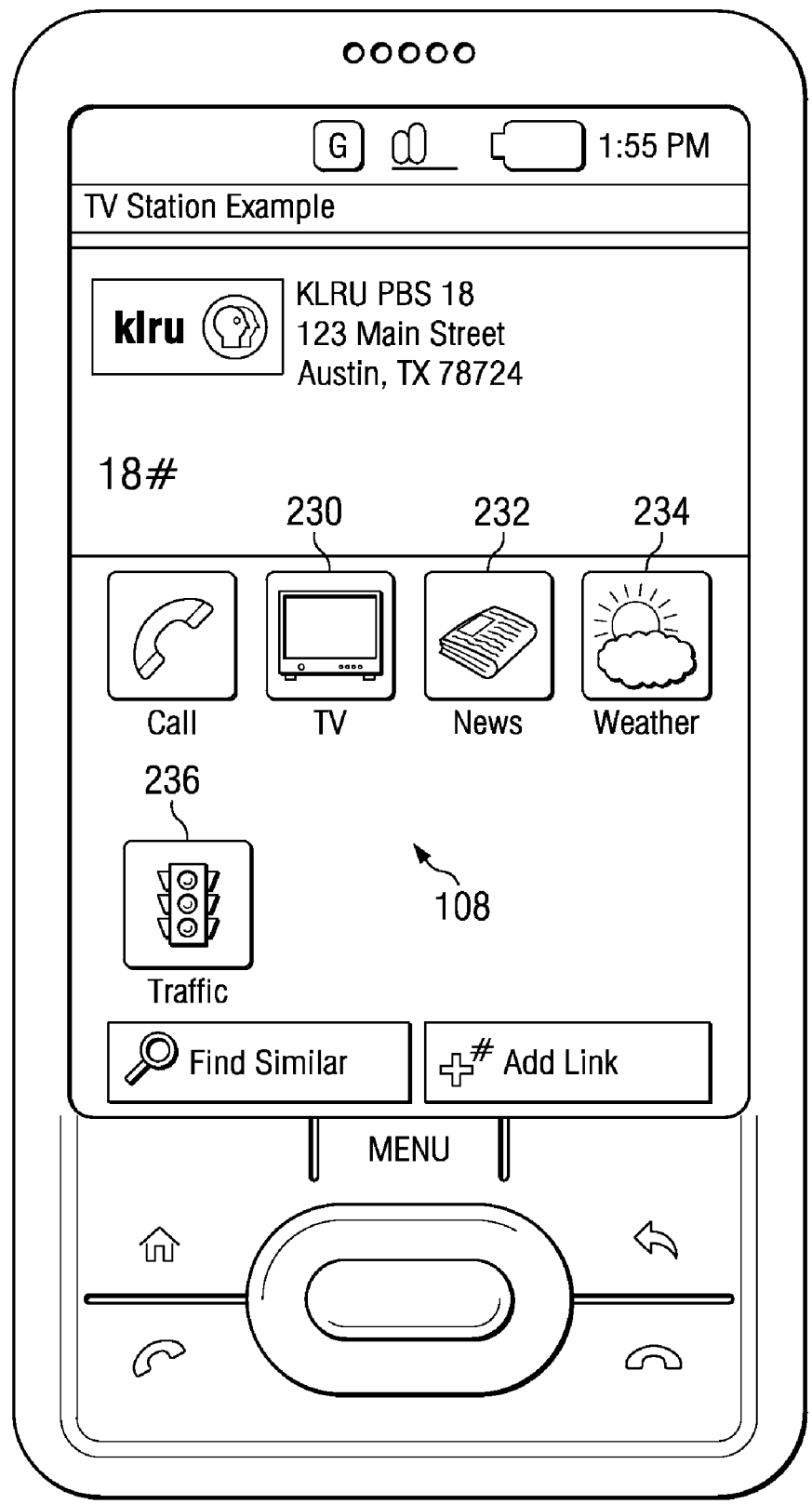
FIG. 7 illustrates an exemplary display screen populated with information and selectable objects pertaining to a television station.

Referring now to FIG. 7 an exemplary set of selectable objects 108 is depicted for the case in which an abbreviated number (18) entered with the DTS 105 corresponds to a local TV station. In this embodiment, the set of selectable objects 108 includes selectable objects that present the user with access to the station's broadcast content including a selectable object 230, the local news via selectable object 232, the local weather via selectable object 234, and local traffic conditions via selectable object 236. If the user wants to access channel 18 in New York City (NYC), the user may dial 1212, one of the area codes used in NYC, followed by 18 and #.

Figure 8:
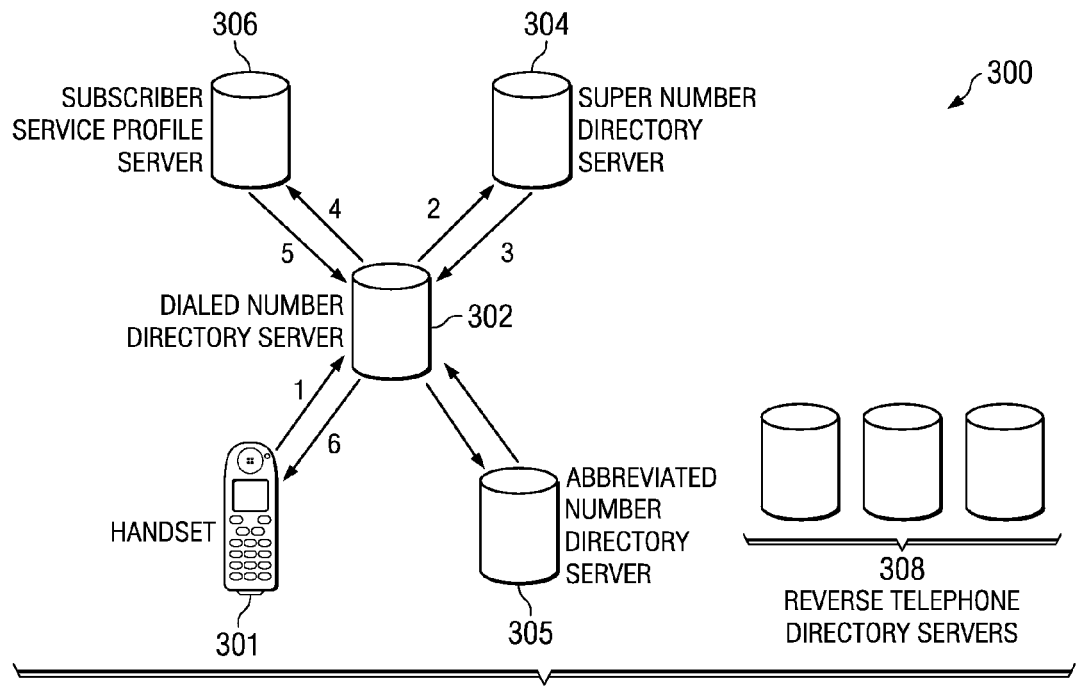
FIG. 8 illustrates selected elements of an embodiment of a network for implementing numeric based addressing and directory services.
Figure 9:
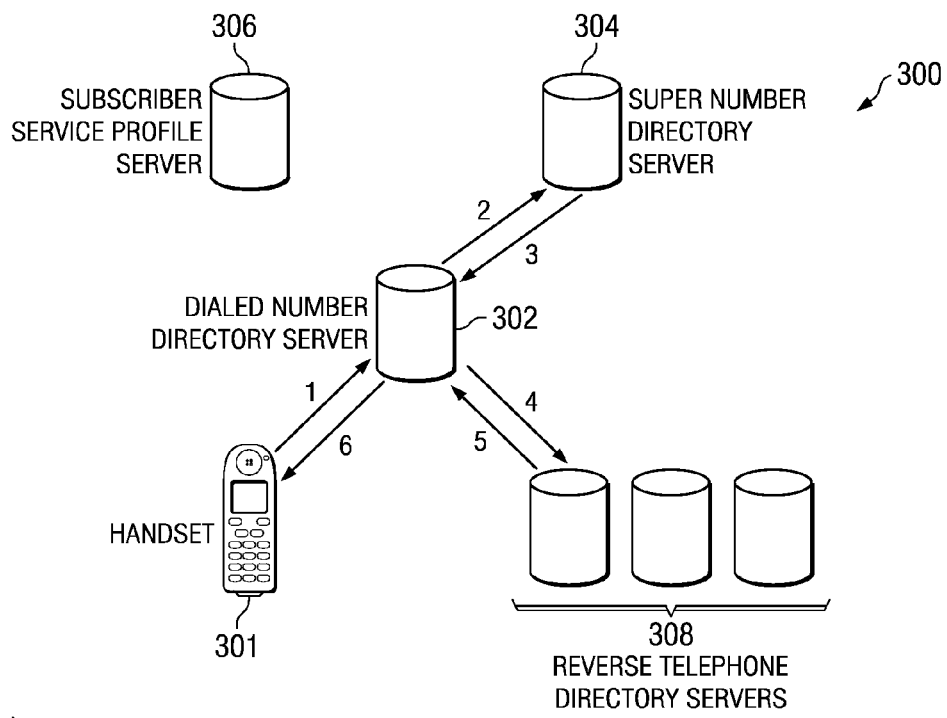
FIG. 9 illustrates selected elements of an alternative embodiment of a network for implementing numeric based addressing and directory services.

Referring now to FIG. 8 and FIG. 9, selected elements of an embodiment of a network suitable for providing numeric based addressing and directory services for enhanced telephony and multimedia services is described. In the depicted embodiments, various directory servers are used to provide information about the targeted numbers, including, as examples, name information, address information, and supported services. In some embodiments, the directory servers described may be implemented as off-the-shelf Linux-based Lightweight Directory Access Protocol (LDAP)-compliant servers. LDAP directories are optimized for fast read access. In these embodiments, queries exchanged between a user agent (UA) in handset 301 and the directory servers and among directory servers are based on the LDAP.

In the depicted embodiments, an EUD in the form of a handset 301 communicates with a dialed number directory server (DNDS) 302. The DNDS 302 communicates with various other servers including a super number directory server (SNDS) 304, a subscriber service profile server (SSPS) 306, and one or more public or private reverse telephone number directory servers 308.

In the depicted implementation, the communication flow among the various servers depends on whether the numeric sequence entered by the user, i.e., the targeted number, matches to a number registered with or otherwise recognized by DNDS 302. The flow of information represented by the numbered arrows 1 through 6 of FIG. 8 illustrates an example in which the dialed number is recognized by DNDS 302 while FIG. 9 depicts an example sequence in which the dialed number is not recognized by DNDS 302.

In either case, the communication flow begins when a user of handset 301 enters a numeric sequence followed by the DTS 105. When the DTS 105 is entered, a user agent of the handset 301 recognizes that the user is not making a telephone call, but is instead requesting services and information that an entity associated with the targeted number may offer. Thus, the user agent, when it detects the entry of DTS 105, sends a message or inquiry to DNDS 302 where the message or inquiry indicates the numeric sequence that was dialed, i.e., the targeted number. If the DTS 105 is the "#" key, the user agent sends any dialed numbers that end with a '#' to DNDS 302.

In some embodiments, DNDS 302 analyzes the targeted number and determines if it is abbreviated, or whether it is a regular number. In North America, regular numbers include the country code 1 followed by 10 digits, including area code. Directory inquiries for such numbers are serviced by the North America DNDS (NA-DNDS). If the targeted number is outside North America, i.e. it begins with "011" or with "+n" where n is not 1, the query is redirected to the corresponding international DNDS based on the dialed country code. For example, a targeted number starting with 01133 would be referred to the server, FR-DNDS.

If the targeted number is abbreviated (as described in the Exemplary Abbreviated Dialing Plan), DNDS 302 forwards the query to the Abbreviated Number Directory Server (ANDS) 305 for further resolution.

If the targeted number is not abbreviated, DNDS 302 generates a query to SNDS 304. SNDS 304 returns information about the number as well as services that are supported and associated services, if the targeted number is listed with it. If the targeted number does not match to any numbers recognized by SNDS 304, as shown in FIG. 9, DNDS 302 generates a query to one or more Reverse Telephone Directory Servers (RTDS) 308 and attempts to find name and address information associated with the targeted number. If such information is found, DNDS 302 returns this information to the UA in handset 301. RTDS servers 308 may include white and yellow page directories, other online directories, social network directories, information obtained from search engines on the Internet and other sources of directory information.

If DNDS 302 does not find any match through either the reverse telephone number directories 308 or the SNDS 304, e.g. in the case of an unlisted number, DNDS 302 may return an "unknown" message to the UA of handset 301.

ANDS 305 may provide a mapping between abbreviated numbers as defined. ANDS 305 may maintain an updated database of radio and TV stations and networks, advertisers, and other parties who may be using abbreviated numbers. ANDS 305 performs a database lookup and provides a corresponding Super Number (SN) that it sends back to 302 DNDS, which in turn, forwards this information to the SNDS 304.

If ANDS 305 finds more than one match for an abbreviated number, e.g., there may be more than one 95*5 FM radio stations in area code 512, DNDS 305 may return multiple super numbers to the user along with a description that would enable the end user to select one of them. For example, entering the numeric sequence and DTS +151295*5# might result in the following matches.

95*5 KLBJ FM, Austin, Tex. (Soft Rock) <+15125552345#>
95*5 KYTR FM, Waco, Tex. (Religious) <+15125552346#>
95*5 KILI FM, Buda, Tex. (Hispanic) <+15125552347#>

If ANDS 305 does not find any matches and the number corresponds to a radio or TV station, ANDS 305 may return to DNDS 302 up to four station listings that are closest to the targeted number, e.g., up to two above, and up to two below. ANDS 305 may then send that information along with corresponding description and Super Numbers.

For example, if the user enters +151295*4#, ANDS 305 may return the following:
93*3 KUT FM, Austin, Tex. (Talk Radio) <+15125552349#>
93*7 KERT FM, Austin, Tex. (Oldies) <+15125552350#>
95*5 KLBJ FM, Austin, Tex. (Soft Rock) <+15125552345#>
95*5 KYTR FM, Waco, Tex. (Religious) <+15125552346#>

The end user may then select one of them or tune to another station.

If ANDS 305 does not find any matches and the number corresponds to a network (such as Sirius Radio), but the subchannel is not valid, ANDS 305 may return a main listing for the applicable network and may include a directory of all the channels. For example, if the user enters +1512174*989#, ANDS 305 may return the SN that corresponds to +1512174# so that the user may view the entire channel listing and scroll up/down.

If ANDS 305 does not find any matches and the number falls in the network address range, ANDS 305 may return a predetermined number of network listings to DNDS 302, e.g., up to 2 above and up to 2 below, along with their description and SN, so that the end-user may select one of them.

If ANDS 305 does not find a match and the number corresponds to a range set aside for advertisers, ANDS 305 may return an error message indicating that the targeted number is not valid.

In some embodiments, SNDS 304 provides access to an updated database of registered numbers and content associated with the numbers. SNDS 304 may perform lookups based on both the originating and targeted numbers and may provide one or more of the following types of information to DNDS 302, which then forwards it to handset 301.

Name
Address
Photo or logo in a fixed format
Short Information (e.g., up to 255 characters)
Yellow Page Classification (if a business)
Website content, formatted for mobile devices
Information about a predetermined number of supported services—the information may include icon graphics, service name, and a telephone number associated with the service. Services may include one or more of the following:
Mapping
Directions Voice Mail
Slide Show
Video Clip(s)
MP3 Collection Access
Favorite # Listing Access
Video over IP
Restaurant Menu
Reservations
Movie Listings
Radio Station Streaming
Radio Network Access
TV Station Streaming
TV Network Access
See What I see (live camera view)
Link to a website These services may correspond to extensions to the telephone numbers associated with them or to IP addresses. For example, an MP3 Collection Access for called number +15125552789# may be +15125552789*22#. In this case, the sequence *22 indicates the MP3 object. The association between *22 and the MP3 may be according to a standard or may be defined by the targeted party.

The information or services identified above may be presented to the user of handset 301 as a selectable objects that appear on the handset's display screen. Some of the information may be provided directly to the handset display screen. For example, in FIG. 1, name information is provided directly to the display screen while a selectable object is presented for videophone service 114.

SNDS 304 may include information about which services are accessible to which subscribers based on user and/or device capability profiles, which may be defined in Subscriber Sever Profile Server 306. In some embodiments, SSPS 306 is implemented as an external server such as a Home Subscriber Server (HSS) as defined by the 3GPP specifications for IP Multimedia Subsystem (IMS). In these embodiments, communication between SNDS and HSS takes place using the Diameter Protocol as described in RFC 3588.

Figure 10:
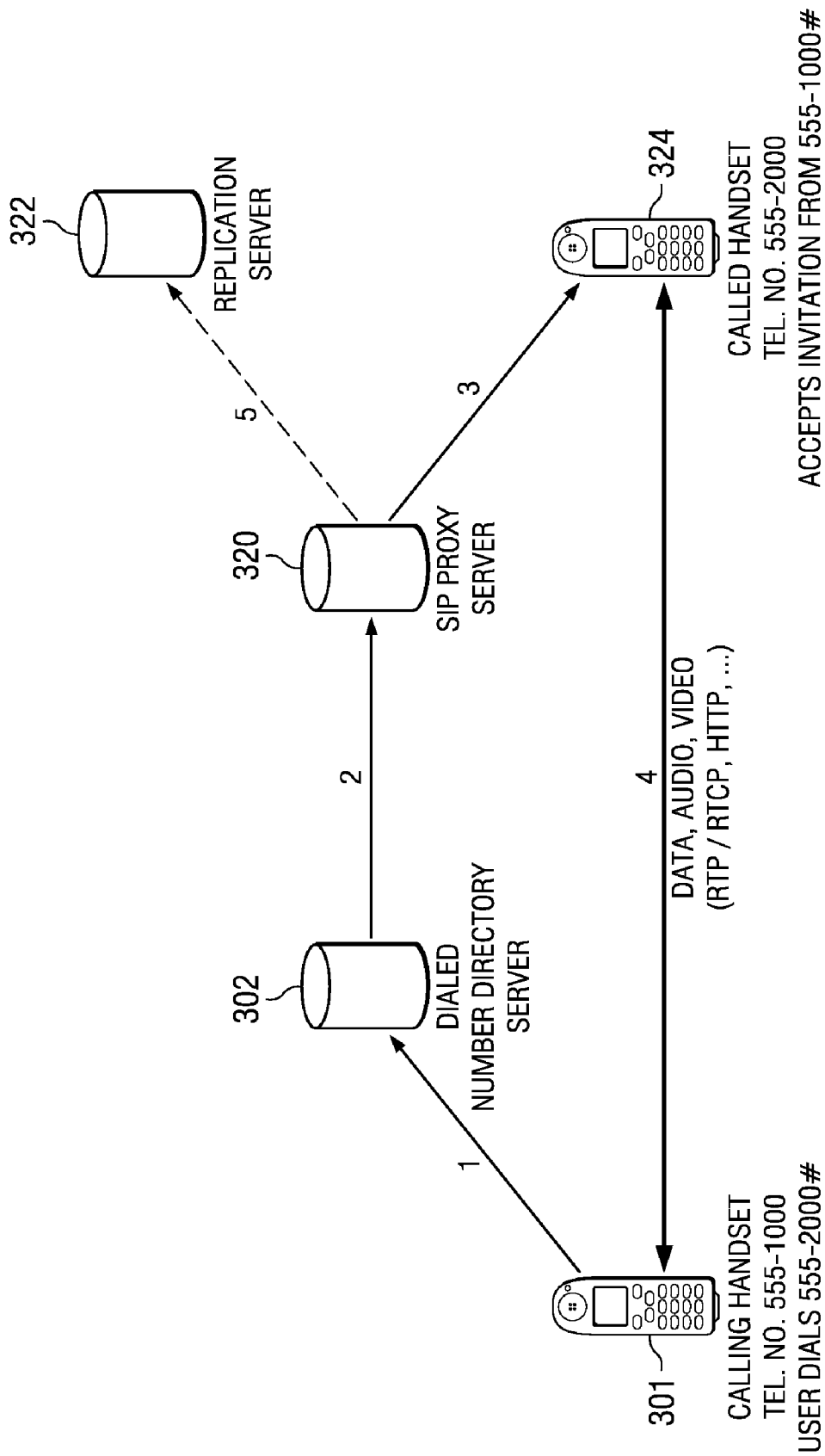
FIG. 10 illustrates selected elements of an embodiment of peer-to-peer communication and delivery of information.

Referring to FIG. 10, an implementation of a system enabling peer-to-peer communication and exchange of information between two handsets is depicted. The figure shows two handsets, 301, and 324, each connected to the network and equipped with the necessary software. Also shown is a DNDS 302, as described earlier, a SIP Proxy Server 320, used to set the communication sessions, and a Replication Server 322. A typical exchange of information takes place in the following steps:

1. User agents residing on handsets 301 and 324 register with the SIP Proxy server 320 when they are available for peer-to-peer services 2. User at handset 301 dials 5552000#3. DNDS 302 makes a query to SIP Proxy Server 320. If destination handset 324 is registered with it, it invites it to accept a session from handset 301 based on standard SIP protocols. If handset 324 accepts, SIP Proxy Server 320 sets up the communication between the two handsets and provides the necessary addressing information for the two handsets to communicate directly.

Figure 11:
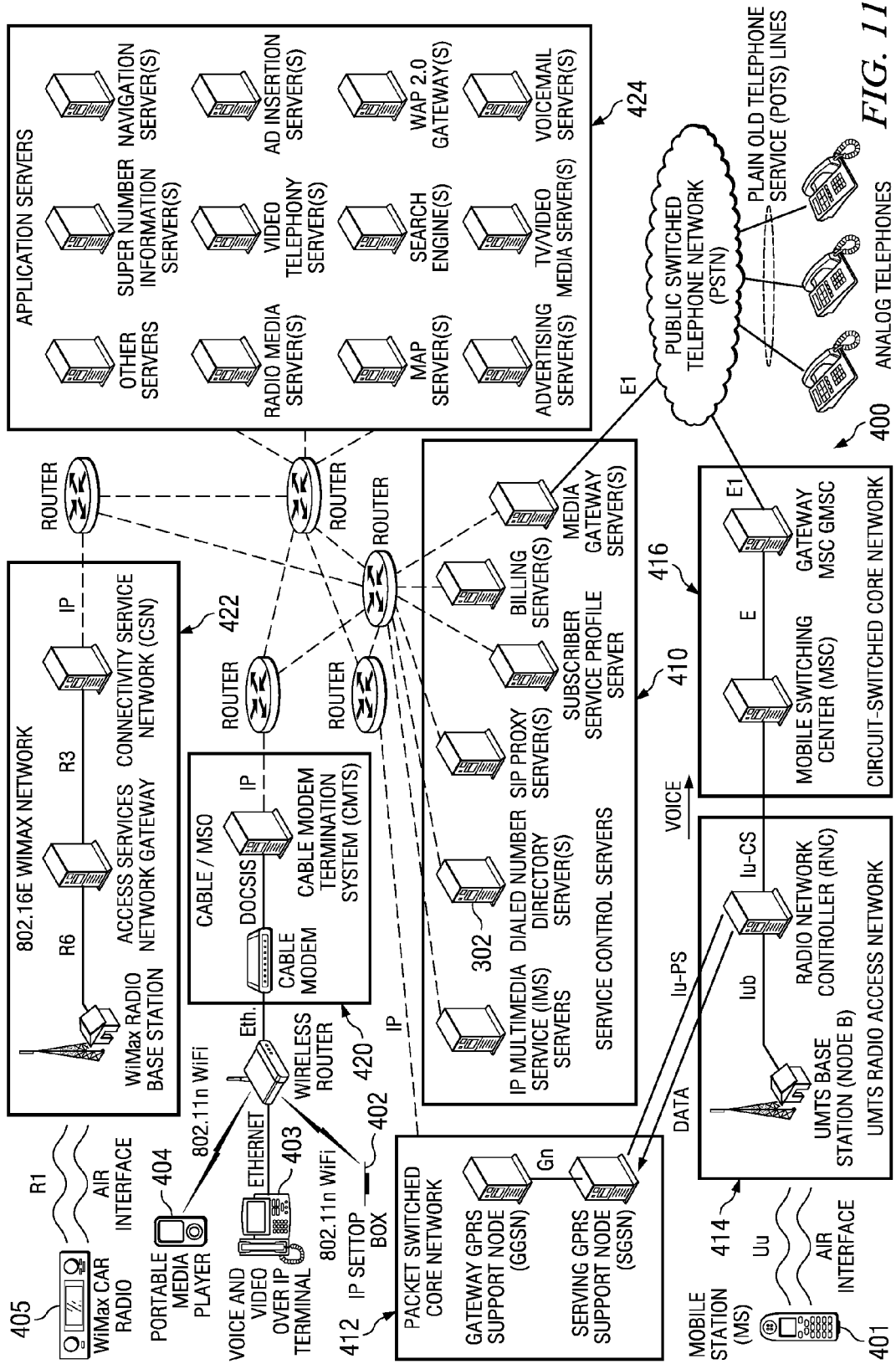
FIG. 11 illustrates selected elements of an embodiment of a network for implementing numeric based addressing and directory services.

Referring now to FIG. 11, selected architectural elements of an embodiment of a network 400 suitable for implementing numeric based addressing and directory services described are presented. FIG. 11 emphasizes a variety of types of EUDs communicating with a common set of servers over various types of network protocols and architectures. In the depicted embodiment, the EUDs leverage existing network protocols and technologies to provide the addressing and indexing services described herein. The depicted implementation is described in terms of 3G telecommunications technologies such as UMTS although other embodiments may employ other 3G technologies or pre-3G technologies including, for example, 2.75G protocols such as GPRS.

In the depicted embodiment, network 400 illustrates EUDs in the form of a mobile handset 401, an IP compliant set top box 402, a VoIP phone 403, a wireless portable media player 404, and a WiMax Car radio 405. Each of the EUDs depicted in FIG. 11 is operable to communicate with service control servers 410 including the DNDS 302 described previously. The depicted implementation of service control servers 410 includes both SIP proxy server(s) as well as IP Multimedia Service (IMS) servers to support various types of underlying technologies, but servers that are provided in any particular implementation may be limited to those necessary to support the implemented protocols.

The handset 401 is shown as communicating voice traffic via UMTS network elements including a UMTS base station, a radio network controller, a mobile switching center and a gateway to the public switch telephone network PSTN. Access to the PSTN may also be achieved via the media gateway server illustrated as one of the service control servers 410.

The handset 401 is also shown as being capable of communicating data traffic via a packet switched core network 412 that includes a serving GPRS support node and a gateway GPRS support node. The packet switched core network 412 communicates data traffic between hand set 401 and service control servers 410 via an IP compliant network and an applicable set of routers.

Thus, as depicted in FIG. 11, it is apparent that mobile handset 401 may include functionality to establish a telephony connection for the purposes of communicating voice traffic via a telephony network that may include a radio access network 414 and a circuit switched core network 416 in communication with the PSTN.

In addition, the depicted embodiment of mobile handset 401 includes functionality to send data communications including data inquiries or messages to a DNDS 302 via an IP compliant network.

In some embodiments, the elements that support the voice traffic may be provided by a first provider such as a telephone company while the elements that support the data traffic may be provided by the telephone company or another provider.

FIG. 11 also depicts various dedicated function EUDs that may not have the capabilities of mobile handset 401. Included in these dedicated function EUDs might be IP set top box 402, voice and video over IP terminal 403 and portable media player 404. In the depicted embodiment, each of these devices is shown as being enabled to communicate data traffic to DNDS 302 via a wireless router/cable modem combination connected to a cable network 420. In other embodiments, the same EUDs may communicate with DNDS 302 via a DSL network via a wireless router/DSL modem combination in connection with a DSL network (not shown).

FIG. 11 also depicts a dedicated function device in the form of a WiMax radio 405 that is operable to communicate with DNDS 302 via a WiMax network 422.

Each of the dedicated function devices 402 through 405 and others that are not depicted may include a respective user agent that is capable of recognizing entry of a numeric sequence/DTS combination and responding to the sequence by generating a request directed to DNDS 302. Thus, for example, WiMax radio 405 may transmit an abbreviated number for a particular radio station and begin to receive content from the radio station and, similarly, IP set top box 402, possibly in conjunction with a remote control device (not depicted), may enter an abbreviated number for a particular television station and thereby receive content from the requested station.

Network 400 as depicted includes various servers that may be employed in conjunction with the numeric based addressing and indexing to provide value added functions to service subscribers. In some embodiments, Application Servers 424 host and execute services, and interface with a call session control function (CSCF) server using SIP protocol. In the depicted embodiment, applications servers 424 may include any one or more of the following:

Radio Media Server: The Radio Media Server provides streaming of radio content along with Meta information regarding programming and advertising. The information on the radio server may be fed into it in real time by broadcast and Internet radio operators in a common format for the audio and for the Meta information. Meta information may include program information, song name, artist name, CD title, a link to a server that can download the song, and advertiser telephone number. The streamed information may also include applicable Digital Rights Management (DRM) information that may restrict what can be done with the music. The radio media server may also maintain statistics about user connections for analysis and billing and interface to a billing server.

TV Media Server: The TV Media Server provides streaming of TV content, including Meta information, similar to that of the Radio Media Server.

Advertising Server: The Advertising Servers may include servers to interact with the radio and television servers to provide directed advertising to listeners and viewers. With the ability to access a vast array of multimedia content including content from other cities and/or countries, an advertising server may be used to coordinate or target advertising that is provided in conjunction with the content. As a simple example, a user who tunes to a Chicago radio station in Chicago may hear an advertisement for a Chicago restaurant while a listener to the same radio station in Austin, Tex. may hear an advertisement for an Austin restaurant at the same time. In these embodiments, the advertising servers may interact with Meta data from the content providers to determine when advertisements can be inserted into the content stream. In some embodiments, the "mixing" of advertisement and content can be performed on the handsets themselves. In these embodiments, for example, advertising servers download advertisements to handsets based on the profiles associated with the handsets so that each handset receives advertising that is most relevant to the user. When content stream metadata indicates a need for an advertisement, the handset may then play one or more of the downloaded advertisements. In this manner, advertising can be highly targeted to the listener or other end user. Whereas local advertisers may not be beneficially affected when a local radio station is streamed over the Internet, the ability to align content consumers and ads relevant to those consumers makes the increased listenership or viewership enabled by networked broadcasting beneficial to all.

MP3 Server: Used to store and play MP3 collections that may be accessed by users. It may play a short advertisement between some of the songs. Note that the MP3 Server application may optionally run on the targeted party's handset or terminal as a peer-to-peer application using SIP protocols.

Slide Show Server (not depicted): Used to store images that users may store alongside their phone numbers. May play soft music in the background, occasionally interrupted by an advertising message.

Video Telephony Server: SIP server with video over IP support

Mapping Server: Used to store addresses of subscribers and can provide directions to a mobile phone in conjunction with a mapping service, such as Google Maps.

Navigation Server: Used in conjunction with GNSS functionality to enable navigation services such as verbal driving instructions to a particular location.

WAP Gateway Server: Sits between devices that support the WAP protocol and the World Wide Web (WWW) parsing pages between one and the other much like a proxy. It translates WWW pages to a form suitable for devices with smaller display size.

Search Engine: Tool for searching for information on the World Wide Web and other network with results optimized for display on mobile devices.

Residential Content Server (not depicted): Allows residential users to program free information/content relating to their phone numbers. Some options may include a photograph, a slide show, MP3 play list, favorite hangouts, and favorite YouTube clips. These options may be available to all callers or limited to selected callers (such as family and friends).

Business Content Server (not depicted): Allows businesses to program some free information/content that are associated with their primary telephone number as well as premium content such as advertising, electronic coupons, advertising, etc.

Billing Server (not depicted): Used to track customer usage of services and to provide appropriate billing services. Also looks for possible fraudulent activities and blocks users from accessing services that they are not subscribed for.

Third Party Servers (not depicted): Used for the delivery of new services developed by third parties. They may include such things as games and Instant Messaging.

Figure 12:
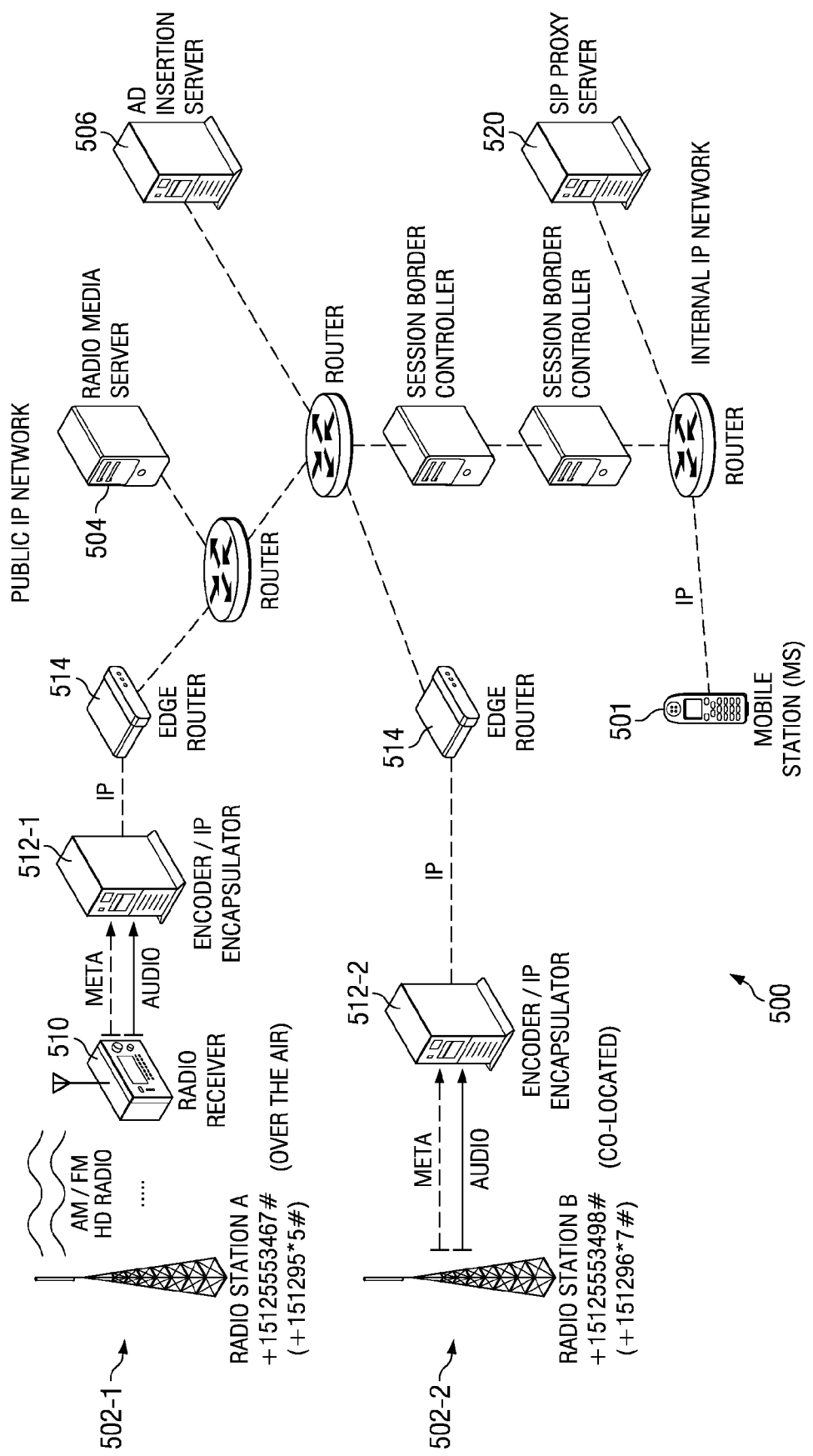
FIG. 12 illustrates selected architectural elements of an embodiment of a network for implementing numeric based addressing and directory services emphasizing multimedia content components.

Referring now to FIG. 12, selected elements of an embodiment of a network 500 suitable for acquiring, processing, and delivering multimedia content such as broadcast radio content to a mobile handset, a WiMax or other form of network aware radio, or another suitable device, in the context of numeric addressing and directory services as described herein is presented. In the depicted embodiment, network 500 illustrates acquisition of broadcast radio content from a first radio station 502-1 by employing a radio receiver 510 to capture the broadcast content and then employing an encoder and IP encapsulator 512-1 to ready the broadcast content for delivery over an IP compliant network to a radio media server 504. The radio media server 504 may serve as one of the application servers 424 of network 400 depicted in FIG. 11.

Network 500 as shown further illustrates a second radio station 502-2 that includes a co-located encoder/IP encapsulator 512-2 so that the broadcast content is captured and streamed over an IP network direct from the broadcaster. The encoded and packetized content, whether from radio station 502-1 or 502-2, is connected through appropriate routers 514 to the radio media server 504. In this embodiment radio media server 504 is configured to buffer radio broadcast or other multimedia content including, as examples, satellite radio content, satellite television and movie content, and so forth. When an EUD enters an abbreviated number for a radio station, the DNDS may establish or enable the EUD to establish a link to the radio media server 504 for purposes of receiving a stream of the broadcast content.

Thus, as shown in FIG. 12, a session or other form of connection is created between mobile station 501 in FIG. 12 and radio station 504 without any intervening directory server. In this embodiment, the directory server(s) are used to provide directory information to the EUD, which is then operable to acquire the desired services directly from the applicable service provider resources. FIG. 12 also illustrates the presence of an ad insertion server 506 that may provide targeted or national advertising content to the mobile station 501. In some embodiments, the advertisements are downloaded from ad insertion server 506 to mobile station 501. Mobile station 501 may then play a downloaded ad at a point in the content broadcast that is indicated as being for advertising, perhaps through the use of appropriate metadata. In this configuration, radio media server 504 can simulcast the broadcast content streams to a very large number of EUDs and leave it to the mobile stations 501 and ad insertion server 506 to determine which advertisements should be downloaded to which mobile stations 501. This determination might be made, for example, based on factors including the service profile of the mobile station's user including demographic information, economic information, subscription information, past use information, and so forth.

Dialing Plan

In order to access services, an end user can dial the PSTN number that is associated with the person or business as well as use abbreviated dialing numbers such as the ones that were listed earlier for TV and radio stations. An exemplary abbreviated dialing plan has been developed to provide a consistent and non-conflicting access for local, national, and international applications. In one implementation, the abbreviated numbering plan may encompass the following:

1: Reserved
2-69: Broadcast TV
70-75: Satellite TV Networks (Free and $$ Content)
(number followed by '#' (or another DTS) provides the directory listing for the network, number followed by "8" and the sub-channel number provides access to the channel)
Examples:
   70# DirectTV Directory
      70*501#->DirectTV Channel 501, HBO East
76-108: Broadcast FM
109-299: Radio Networks
(number followed by '#' (or another DTS) provides the directory listing for the network, number followed by "8" and the sub-channel number provides access to the channel)
Examples:
   174#->Sirius Radio Network Channel Guide
      174*101#->Howard Stern (on Sirius channel 101)
300-519: TV Networks
(number followed by '#' (or another DTS) provides the directory listing for the network, number followed by "8" and the sub-channel number provides access to the channel)
520-1720: Broadcast AM Stations
Example:
   690#->local AM station (690 kHz)
1721-9999: Premium Local or National Advertising Channels
1800 0000-1800 9999, 1866 0000-1866 9999, 1877 0000-1877 9999, and 1888 0000-1888 9999: National Advertising Channels (Free Content)
Example:
   18004344#->ABC Catalog
1900 0000-1900 9999: National Subscription Channels
Notes:
1. Direct Dialing followed by # (or another DTS) accesses the channels listed above, if available
2. Area code/country code dialing followed by # accesses the local channels in the corresponding area (For example, 131292*3#->92.3 FM in Chicago, Ill., while 01131192*3->92.3 FM in Paris, France).

The described dialing plan is designed to be supported on all types of terminals including Plain Old Telephone System (POTS) phones, Integrated Services Digital Network (ISDN) phones, Voice over Internet Protocol (VoIP) terminals, mobile phones, Personal Computers (PCs), as well as communication-equipped car radios and television sets. The range of services that are available to each class of terminal will depend on its capabilities. For example a POTS telephone set may be able to call a radio station or listen to its broadcast in mono bandwidth-reduced manner, while a car radio may only be able to listen to broadcast radio, Internet radios, book-on-tape programs, and TV audio broadcasts.

An innovation relating radio and television sets allows the user to program a different location into the set, say by entering 1, area code, and # pressed for 3 seconds (or 011 followed by country code and # pressed for 3 seconds). The radio or TV will then behave as if it were physically located in a different city, like New York or Paris. The user can scan stations and have a similar experience as someone located in that city. Another button combination may provide that feature, but on a time-shifted basis, so that the user can enjoy morning or evening programming at the same time.

The servers may reside inside the service provider's private IP networks or on public IP networks, such as the Internet or a combination of both. The servers may operate independently or as a part of the IP Multimedia Subsystem (IMS) architecture as defined by the 3GPP, 3GPP2, and TISPAN standards. Its detailed description and standards are described in the references. It should be noted that these standards are evolving and are subject to change. The subject matter described herein does not require the presence of an IMS architecture and can operate without it. It can, however, coexist with IMS and use some of its network elements.

It should be noted that some of the Application Servers may reside in the terminals of the called subscribers as peer-to-peer service delivery. For example, the MP3 collection of a called subscriber may reside on a stand-alone audio server or may be located locally on the called subscriber's terminal or both.

As discussed previously, the disclosed subject matter encompasses peer-to-peer delivery of information such as media content, GPS location, live camera feed. In this aspect, an EUD of a targeted party may execute a mobile server application that interacts with a web browser application executing on the originating party's EUD.

The disclosed subject matter still further encompasses access of information from a website. In this aspect, a user dials a number followed by the DTS. The DNDS may invoke an Internet search engine to search for the dialed number. If a match is found, a broadband or narrowband, e.g., a WAP version, of the matching website may be sent to the originating party's EUD where a web browser application executing on the EUD may display the website.

The disclosed subject matter still further encompasses an enhanced display of information in response to an incoming call. In this aspect, a targeted party receives an incoming call from an originating party. The targeted party may assert "#" or another DTS. The targeted party may thereby obtain enhanced information about the originating party including, information that may be available to the user when the user dials the party as depicted and described with respect to FIG. 1.

The disclosed subject matter still further encompasses display of information during the course of the call. In this aspect, irrespective of who initiated the call, a user may assert a DTS or other predetermined button and the selectable objects associated with the other person's number may be displayed. This feature may be beneficial in peer-to-peer applications such as media sharing, GPS information access, and camera view (see what I see) applications.

The disclosed subject matter still further encompasses integration of super number information and a user's contact list and/or white page or yellow page front ends. If a user does not remember or know a number beforehand, the user may be able to employ contacts lists or existing directories to append a DTS to otherwise initiate the data inquiry associated with a DTS as described herein.

Figure 13:
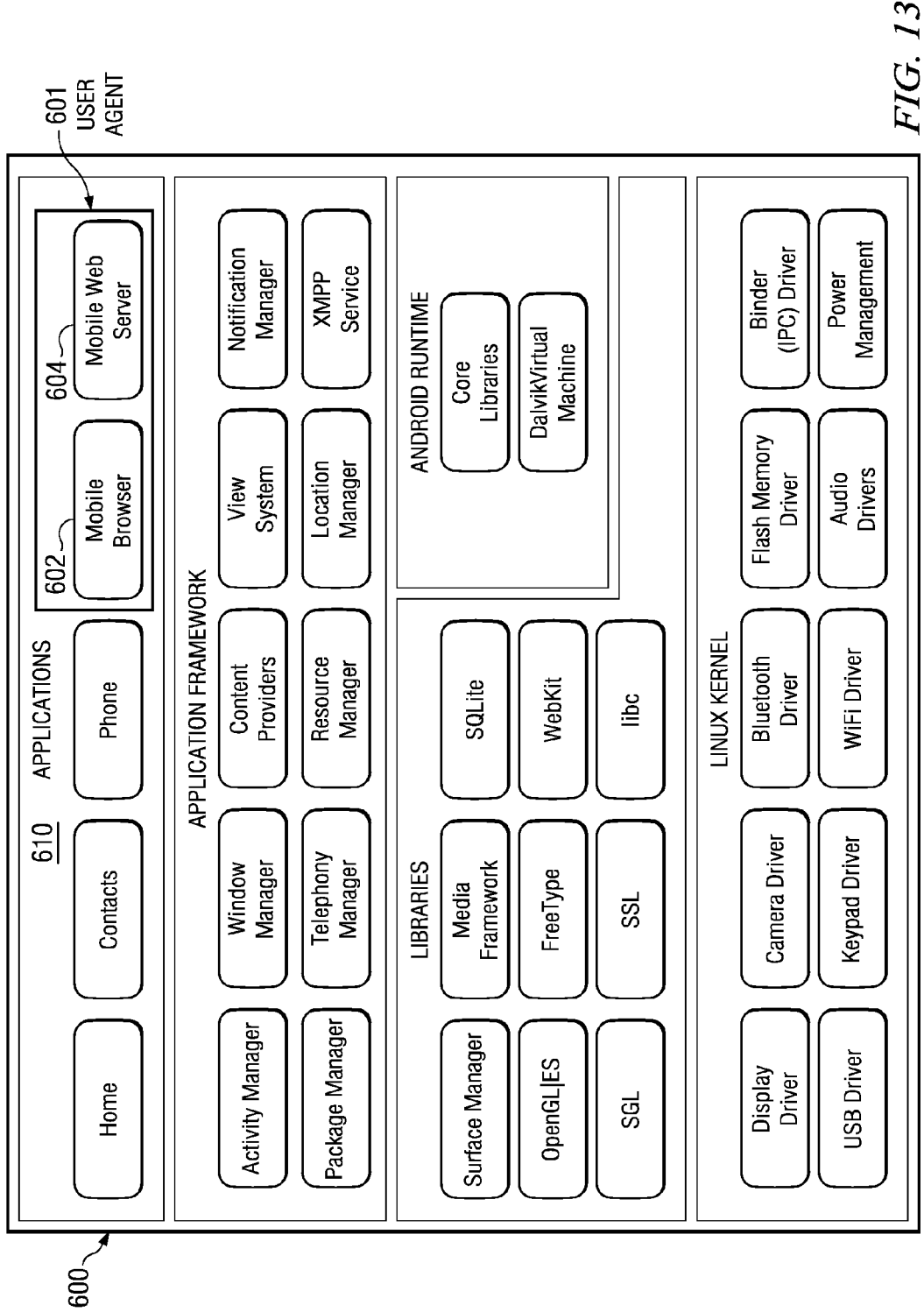
FIG. 13 illustrates selected elements of an exemplary software platform for an end user device.
Figure 14:
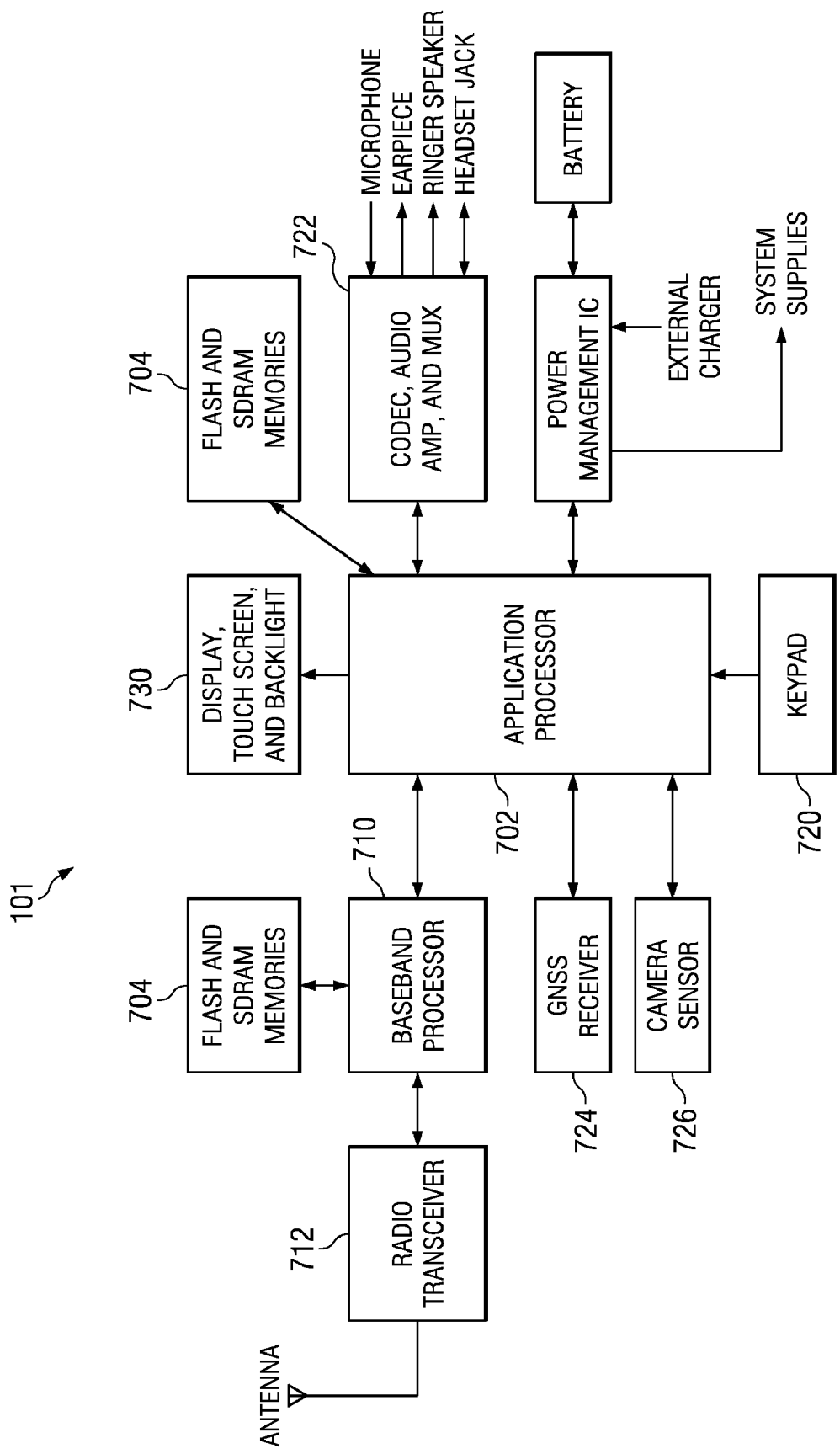
FIG. 14 is a block diagram of selected elements of an exemplary end user device according to one embodiment of the invention.

Referring now to FIG. 13 and FIG. 14, an exemplary representation of a software platform and a hardware implementation for EUD 101 are presented. In the depicted embodiment, EUD 101 employs an Android software platform 600 as described by the Open Handset Alliance. In this embodiment, the great majority of the software and firmware resources for establishing communications, controlling the EUD hardware, and performing supporting functions are provided in a standardized and openly available configuration. The UA 601 is then incorporated into the application layer 610 of the software to modify the phone application's dialer and to support the menus and functions described previously, including as an example, presenting the selectable objects to the display screen when the DNDS returns information.

In some embodiments, UA 601 executes on a Mobile Handset or other similar EUD as described. As indicated above, UA 601 may be implemented as an application layer program executing over an Android operating system, a project of the Open Handset Alliance Project. See http://code.google.com/android/ for more details. The operating system is based on the Linux kernel and is architected in a modular manner as shown in FIG. 12.

UA 601 may be developed using the Android SDK tools (see http://code.google.com/android/download.html) and takes advantage of the object-oriented Application Framework, Libraries and Runtime.

Depending upon the implementation, UA 601 may include:

A dialer application that supports the keypad of the mobile handset, be it actual, soft, or touch-based. In the shown example, a touch screen key input is supported along with hardware keys for Home, Menu, 5-way navigation, Back, SEND and END/CLEAR. The dialer application also controls the display. It provides the user with the ability to enter the desired telephone number followed by a '#' or another DTS at the end. The dialer application features a Phonebook function, a recent call function key, a voicemail function key, and a "Media Links" key which displays the list of numbers ending with # which the user has saved in memory. See FIG. 7 for an example.

The user interface (UI) is made up of object libraries in the Android Java library (from the SDK), where the UI elements reside, for example TextView. The application graphics are displayed by the Framework elements Activity Manager and Window Manager, and the back-end features of the application utilize several components of the Telephony Manager and Resource Manager, borrowing from other Framework pieces as needed. The Libraries used are the Media Framework, SQLite, WebKit and SSL, again using other Libraries as needed. This will all run in the Android Runtime environment on Linux.

A Session Initiation Protocol (SIP) User Agent (UA) which communicates with SIP proxy servers to request information and to receive access to information and services. In particular, the SIP UA communicates with the Dialed Number Directory Server to receive the address and supported services information for a given targeted number ending with a #. The SIP User Agent supports the streaming of media by higher protocols, such as RTSP.

The SIP UA also supports certain peer-to-peer services, such as the ability to listen to the MP3 collection of the targeted party (a handset also equipped with a SIP UA). In that case the caller's User Agent and the targeted party's User Agent provide session support for this activity. Also, SIP UA supports the ability to leave voicemail on the targeted party's handset by communicating with its UA application.

The SIP User Agent supports calling or targeted party functions as well as optionally SIP proxy functionality for media sharing applications.

A mobile web browser 602 capable of making HTTP requests to other user agents and websites and displaying the received information on the screen. This application is optimized for mobile applications and supports the Wireless Application Protocol (WAP) 2.0.

A mobile web server 604 capable of receiving HTTP requests from other user agents or web browsers and serving them HTTP responses along with optional data contents such as some of the objects shown in FIG. 1. This server is optimized for mobile applications and supports the WAP 2.0 standard.

Referring to FIG. 14, selected hardware elements of an embodiment of a suitable EUD are illustrated. In the depicted embodiment, EUD 101 includes an application processor 702 that has access to a storage resource 704 in the form of flash and/or SDRAM memory modules that may store the code necessary to implement the Android or other type of operating system as well as the application programs including the UA described above.

In the depicted embodiment, the EUD 101 further includes a baseband processor 710 and radio transceiver that are operable to establish communications in a 3G, 4G or other suitable type of telecommunications protocol. The depicted EUD further includes a keypad 720, which may include soft keys, hard keys, or a combination thereof, a display device 730 which may or may not include touch screen functionality. Various additional I/O devices including a microphone, speakers, and so forth may be connected to EUD 101 via an audio codec 722. Other embodiments may further include video codecs that support the playing of streaming multimedia content including video content. It will be appreciated that the hardware elements of the depicted embodiment of EUD 101 are known to those skilled in the art and that it is through execution of the application software including the UA as described that the EUD achieves the described numeric addressing and directory services. Although the depicted embodiment of EUD 101 includes a variety of peripheral devices, other implementations, such as a network aware automobile radio, may employ fewer or simpler I/O devices.

What is claimed is:

1. An end user device, comprising:
    an application processor;
    tangible computer readable storage accessible to the processor, the storage including processor executable instructions for a numeric addressing application user agent;
    a keypad suitable for inputting a numeric string and a terminating entry;
    a display screen; and
    a wired or wireless transceiver configured to communicate via a broadband communications network;
    wherein the numeric addressing application user agent includes instructions for:
        initiating the establishment of a telephony connection in response to detecting entry of a numeric sequence followed by a first type of terminating entry; and
        initiating a data query in response to detecting entry of the numeric sequence terminating with a second type of terminating entry.

2. The device of claim 1, wherein the second type of terminating entry comprises a "#" key.

3. The device of claim, 1, wherein initiating the data query includes:
    determining if the numeric sequence comprises an abbreviated number based on an abbreviated number plan and, if so, determining a super number corresponding to the abbreviated number based on an abbreviated number plan; and
    determining if the numeric sequence or a super number corresponding to the abbreviated number is recognized by a super number server and, if so, determining information and services associated with an entity corresponding to the numeric sequence and presenting the information and services to the user agent.

4. The device of claim 3, wherein the user agent is configured to present a set of selectable objects to a display screen wherein the selectable objects corresponds to services associated with the numeric sequence.

5. The device of claim 4, wherein one of the selectable objects comprises a VOICEMAIL object and wherein selecting the VOICEMAIL object enables the user to leave a voice mail message with the entity without ringing through to a telephone of the entity and without navigating a voice mail message system.

6. The device of claim 4, wherein the set of selectable objects is determined by an entity associated with the numeric sequence based on a relationship between a user and the entity.

7. The device of claim 3, wherein determining if the numeric sequence comprises an abbreviated number includes prepending a country code, an area code, or both to the numeric sequence, wherein the prepended codes are selectable by the user.

8. The device of claim 7, wherein the abbreviated number corresponds to a broadcast frequency or station number of a multimedia content provider and wherein determining if the numeric sequence is recognized by the super number directory server comprises determining if a broadcaster is associated with the broadcast frequency or station number within a geographic area defined by the prepended codes.

9. The device of claim 1, wherein the numeric addressing application user agent includes instructions for:
    after the establishment of a telephony connection to a called party, responding to detecting assertion of a predetermined control element, by displaying information associated with the called party.

10. The device of claim 1, wherein the numeric addressing application user agent includes instructions for:
    selecting a targeted advertisement selected based on user information indicative of a user of the end user device;
    inserting the targeted advertisement into a content stream, the content stream selected from a radio stream and a television stream, to create a targeted stream; and
    displaying the targeted stream on the display screen.

11. A method of providing enhanced telephony service, comprising:
    enabling an end user device (EUD) to establish a telephony connection, suitable for accommodating a real-time voice communication, with an entity in response to entry of a numeric sequence associated with the entity followed by a first type of termination; and
    enabling the EUD to transmit a directory inquiry, in response to entry of the numeric sequence followed by a second type of termination, wherein the directory inquiry is associated with the entity.

12. The method of claim 11, enabling the EUD to receive a response to the directory inquiry wherein the response includes a set of selectable objects and display the objects on a display screen of the EUD wherein the selectable objects are associated with services pertaining to the entity.

13. The method of claim 12, wherein the entity is an individual and the objects include an object for leaving voice mail for the individual without ringing through to a telephone or navigating a voice message system.

14. The method of claim 12, wherein the entity is a business and the objects include and object for receiving navigable directions, in conjunction with GNSS functionality of the EUD, for navigating to a location of the entity.

15. The method of claim 12, wherein the entity is a business and the objects include an object displaying a map or directions to the business.

16. The method of claim 12, wherein the entity is a broadcast radio station and the objects include an audio object that enables the EUD to receive the broadcasted content via an internet connection.

17. The method of claim 12, wherein the data inquiry is transmitted to a directory server via IP communication resources of a 2.75G, 3G, or 4G wireless communication network or a wired broadband communication network.

18. A method of offering a data service employing numeric addressing, the method comprising provisioning a communication device to:
   detect a dialed input comprising a numeric sequence followed by a specified termination sequence;
   respond to detecting said dialed input by transmitting a message indicative of the numeric sequence to a first directory server; and
   detect and process information responsive to the message, wherein said processing of the information includes displaying at least one icon for taking an action pertaining to an entity associated with the targeted number.

19. A dialed number directory server (DNDS) suitable for use in a communication network,
   wherein the DNDS is configured to detect a DNDS inquiry from an electronic device, wherein the DNDS inquiry is indicative of a numeric sequence, and wherein the DNDS is further configured to determine whether enhanced directory information or services are available for an entity associated with the numeric sequence, and wherein the DNDS is further configured to return to the electronic device information indicative of any such information or services;
   wherein the numeric sequence is (a) an abbreviated number indicative of an entity according to a specified numbering plan or (b) indicative of a telephone number associated with the entity; and
   wherein the abbreviated number, under the specified numbering plan, for a radio station is the broadcast frequency of the station or the abbreviated number for a television station is the channel number of the station.

20. The DNDS server of claim 19, wherein the server is configured to determine a super number corresponding to the abbreviated number when the numeric sequence is an abbreviated number, wherein the super number is indicative of a telephone number associated with the entity.

21. The DNDS server of claim 20, wherein the server is configured to determine the super number by querying an abbreviated number directory server (ANDS), wherein the ANDS implements the specified numbering plan.

22. A dialed number directory server (DNDS) suitable for use in a communication network,
   wherein the DNDS is configured to detect a DNDS inquiry from an electronic device, wherein the DNDS inquiry is indicative of a numeric sequence, and wherein the DNDS is further configured to determine whether enhanced directory information or services are available for an entity associated with the numeric sequence, and wherein the DNDS is further configured to return to the electronic device information indicative of any such information or services;
   wherein the numeric sequence is (a) an abbreviated number indicative of an entity according to a specified numbering plan or (b) indicative of a telephone number associated with the entity; and
   wherein the DNDS server is further configured to determine if an entity associated with the abbreviated number or the telephone number is registered with a Super Number Directory Server (SNDS), wherein the SNDS is configured to identify services and information provided by an entity associated with the numeric sequence that are compatible with a services profile of a user of the electronic device as well as the capabilities of the electronic device.

23. A mobile device comprising an application processor, a baseband processor, and a radio transceiver, the mobile device further including storage accessible to the application processor and computer executable instructions, embedded in the storage, for a user agent application, the user application including instructions for:
   transmitting a directory server inquiry in response to entry of a numeric sequence followed by a data termination sequence, wherein the directory server inquiry is indicative of the numeric sequence and the numeric sequence is associated with a targeted entity;
   receiving information indicative of at least one service associated with the targeted entity in response to the directory server inquiry; and
   generating a display indicating the associated service or services when the mobile device includes a suitable display.

24. The mobile device of claim 23, wherein the electronic device is selected from the group consisting of a WiMax radio, an IP set top box, a wireless MP3 player or other suitable type of audio player, or a VoIP telephone or videophone.

25. The mobile device of claim 23, wherein the user agent application further includes instructions for initiating a telephony session with the targeted party.

26. The mobile device of claim 23, wherein the user agent application further includes instructions for:
   establishing a peer to peer communication with a mobile device of the targeted party, wherein the peer to peer communication facilitates services including media sharing services enabling the mobile device to access media content on the targeted device, see-what-I-see service enabling the mobile device to display video content captured by a camera associated with the targeted device, and GNSS location services enabling the mobile device to access GNSS information received by the targeted device.

27. The mobile device of claim 23, wherein the user agent application further includes instructions for:
   enabling the mobile device to receive content accessed from a website by a directory server in response to the mobile device terminating a numeric sequence input with a data termination sequence.

28. The mobile device of claim 23, wherein the user agent application further includes instructions for:
   enabling the mobile device to initiate a query in response to an incoming call from a calling party, wherein, in response to the query, the mobile device receives and displays enhanced directory information associated with the calling party.

29. The mobile device of claim 23, wherein the user agent application further includes instructions for:
   enabling the mobile device to initiate a query during an existing call with a calling party, wherein, in response to the query, the mobile device receives and displays enhanced directory information associated with the calling party.

30. The mobile device of claim 23, wherein the user agent application further includes instructions for:
   enabling the mobile device to invoke the directory server query via a contacts list accessible to the mobile device.

* * * * *